United States Patent
Andersson et al.

(10) Patent No.: US 8,576,906 B2
(45) Date of Patent: Nov. 5, 2013

(54) ADAPTIVE FILTERING

(75) Inventors: Kenneth Andersson, Gavle (SE);
Jonatan Samuelsson, Skarpnack (SE);
Clinton Priddle, Upplands Vasby (SE);
Per Frojdh, Stockholm (SE); Rickard Sjoberg, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 475 days.

(21) Appl. No.: 12/811,595

(22) PCT Filed: Oct. 8, 2008

(86) PCT No.: PCT/SE2008/051149
§ 371 (c)(1),
(2), (4) Date: Jul. 2, 2010

(87) PCT Pub. No.: WO2009/088340
PCT Pub. Date: Jul. 16, 2009

(65) Prior Publication Data
US 2010/0284458 A1    Nov. 11, 2010

Related U.S. Application Data

(60) Provisional application No. 61/019,727, filed on Jan. 8, 2008, provisional application No. 61/123,769, filed on Apr. 11, 2008.

(51) Int. Cl.
*H04N 7/12*     (2006.01)
*H04N 11/02*    (2006.01)
*H04N 11/04*    (2006.01)

(52) U.S. Cl.
USPC ................................... 375/240.03

(58) Field of Classification Search
USPC ................................... 375/240.03
See application file for complete search history.

(56) References Cited

U.S. PATENT DOCUMENTS

| | | | | |
|---|---|---|---|---|
| 6,037,986 | A * | 3/2000 | Zhang et al. | 375/240.12 |
| 2006/0088098 | A1* | 4/2006 | Vehvilainen | 375/240.03 |
| 2007/0064816 | A1* | 3/2007 | Chiang et al. | 375/240.29 |
| 2007/0092000 | A1* | 4/2007 | Chen et al. | 375/240.03 |

OTHER PUBLICATIONS

Authors: Y. Vatis, J. Ostermann Title: "Prediction of P- and B-Frames Using a Two-dimensional Non-separable Adaptive Wiener Interpolation Filter for H.264/AVC" Date: Apr. 2006 Source: Universitat Hannover, Institut fur Informationsverarbeitung.*

(Continued)

*Primary Examiner* — Mehrdad Dastouri
*Assistant Examiner* — Jared Walker

(57) ABSTRACT

A method and device for determining an adaptive filter having multiple filter parameters, wherein a first filter parameter has a first level of adaptivity and a second filter parameter has a second, different level of adaptivity. Parameter values for the first filter parameter are determined among a first set of allowable filter parameter values. Parameter values for the second filter parameter are correspondingly determined among a second, different set of allowable filter parameter values. The different levels of adaptivity in the filter parameters are achieved because the second set includes more allowable filter parameter values than the first set. The adaptive filter is advantageously used in filtering in intra- or inter-predication during video encoding and decoding.

16 Claims, 10 Drawing Sheets

(56) References Cited

OTHER PUBLICATIONS

Vatis Y et al: "Prediction of P and B-Frames Using a Two-dimensional Non-separable Adaptive Wiener Interpolation Filter for H.264/AVC" Joint Video Team (JVT) of ISO/IEC MPEG & ITU-T VCEG (ISO/IEC JTCI/SC29/WGII and ITU-T SG16 Q6), XX, XX, No. M13113, Mar. 22, 2006, XP030041782.

Yuri Vatis et al: "Locally Adaptive Non-Separable Interpolation Filter for H.264/AVC" Image Processing, 2006 IEEE International Conference on, IEEE, PI, Oct. 1, 2006 XP031048566.

Wedi T: "Adaptive interpolation filter for motion and aliasing compensated prediction" Visual Communications and Image Processing; Jan. 21-23, 2002, San Jose, XP030080537.

Wittmann S et al: "Separable adaptive interpolation filter" TU-T SGI6/Q6, Question 6/16, Study GROUP16—Contribution 219, Document Com 16-C 219-E, Geneve, Switzerland, Jun. 1, 2007 XP007907321.

ITU-T Rec. H.264 / ISO/IEC MPEG 14496-10. May 2003.

Vatis, et al., Two-Dimensional Non-separable Adaptive Wiener Interpolation Filter for H-264/AVC. *ITU—Telecommunications Standardization Sector*, Study Group 16,Question 6, Document VCEG-Z17, Apr. 2005.

Rusanovskyy et al., Adaptive interpolation with directional fitters, *ITU—Telecommunications Standardization Sector*, Study Group 16, Question 6, Document VCEG-AG21, Oct. 2007.

Ye, et al. Enhanced Adaptive Interpolation Filter, *ITU—Telecommunications Standardization Sector*, Study Group 16, Question 6, Document C-464, Apr. 2008.

Tsukuba, et al. Adaptive Multidirectional intra Prediction. ITU-Telecommunications Standardization Sector, VCEG-AG05, Oct. 20, 2007.

Andersson, K., Complexity reduced separable adaptive interpolation filter, *ITU—Telecommunications Standardization Sector*, Study Group 16, Question 6, Document VCEG-AH27, Jan. 2008.

KTA reference Model 1.6, http://iphone.hhi.de/suehring/tml/download/KTA/jm11.0kta1.6zip, Jan. 2008.

Vatis, et al., Comparison of complexity between Two-Dimensional Non-Separable Adaptive Interpolation Filter and Standard Wiener Filter, *ITU—Telecommunications Standardization Sector*, Study Group 16, Question 6, Document VCEG-AA11, Apr. 2005.

BJøntegaard, G. Calculation of Average PSNR Differences between RD-Curves, *ITU—Telecommunications Standardization Sector*, Study Group 16, Question 6, Document VCEG-M33, Apr. 2001.

Tan, et al., Recommended Simulation Common Conditions for Coding Efficiency Experiments Revision 2. *ITU—Telecommunications Standardization Sector*, Study Group 16, Question 6, Document VCEG-AH10, Jan. 2008.

\* cited by examiner

ADAPTIVE FILTERING

This application claims the benefit of U.S. Provisional Application No. 61/019,727, filed Jan. 8, 2008, and U.S. Provisional Application No. 61/123,769, filed Apr. 11, 2008, the disclosure of which is fully incorporated herein by reference.

TECHNICAL FIELD

The present invention generally relates to adaptive filtering, and in particular to adaptive filters useful in inter and intra prediction applicable to image and video coding.

BACKGROUND

Temporal and spatial redundancy can be exploited using predictions to make a compact representation of the video signal possible. Pixel prediction is an important part of video coding standards such as H.261, H.263, MPEG-4 and H.264 [1]. In H.264 there are three pixel prediction methods utilized, namely intra, inter and bi-prediction. Intra prediction provides a spatial prediction of the current pixels block from previously decoded pixels of the current frame. Inter prediction gives a temporal prediction of the current pixel block using a corresponding but displaced pixel block in a previously decoded frame. Bi-directional prediction gives a weighted average of two inter predictions.

The inter prediction method of H.264 can achieve fractional-pel resolution in the motion estimation. A fixed half-pel filter with filter taps [1 −5 20 20 −5 1]/32 is first applicable to obtain initial half-pel resolution. A bilinear filter can then be applied on a full-pel sample and a half-pel sample to achieve quarter-pel resolution. These fractional-pel interpolation filters used in H.264 are fixed, implying the same filter taps are used regardless of which particular block that is encoded.

Many techniques have been suggested to improve the inter prediction over the years, for instance by employing adaptive interpolation filters. Such an approach has been suggested by first determining displacement vectors using the fixed H.264 interpolation filter for each image block to be coded. With the obtained displacement vectors, a calculation of adaptive filter coefficients of a two-dimensional non-separable adaptive Wiener interpolation filter [2], a separable adaptive interpolation filter [3], a directional adaptive interpolation filter [4] or an adaptive interpolation filter [5] is then done afterwards.

SUMMARY

The prior art adaptive interpolation filters are marred by being complex since all filter taps have the same amount of adaptivity. This in turn leads to extensive computational efforts when determining the filter coefficients of the filters and when using them for filtering input data. Furthermore, substantial overhead is required for representing the filters in the encoded signal.

The present embodiments overcome these and other drawbacks of the prior art arrangements.

It is a general objective to provide an adaptive filter having filter parameters with different levels of adaptivity.

This and other objectives are met by the embodiments as defined by the accompanying patent claims.

Briefly, an adaptive filter having multiple filter parameters is determined by defining or categorizing the multiple filter parameters into at least two types of filter parameters having different levels of adaptivity. Thus, at least one filter parameter of the adaptive filter is defined as having a first level of adaptivity and at least one other filter parameter is defined as having a second, different level of adaptivity. The filter parameter values for the filter parameter or parameters having the first level of adaptivity are determined or selected among a first set of allowable filter parameter values. A corresponding second, different set of allowable filter parameter values is used for determining the filter parameter values for the filter parameter or parameters having the second level of adaptivity.

The difference in adaptivity of the filter parameters is achieved since the second set comprises more allowable filter parameter values than the first set.

In an embodiment, the filter parameters of the adaptive filters are filter taps of the filter. In such a case, the adaptive filter has multiple filter taps of which at least one has a first level of adaptivity and at least one other filter tap has a second, different level of adaptivity. The respective filter coefficients for the filter taps having different levels of adaptivity are preferably determined by optimization of different optimization criteria. For instance, the filter coefficients for the filter taps of the first, coarse level of adaptivity can be determined to reduce the complexity of a filtering operation using the adaptive filter for filtering input data. The filter coefficients for the filter taps of the second, fine level of adaptivity are preferably determined on the constraint of the filter taps with the coarse accuracy and adaptivity, more preferably by minimizing an error between original data and filtered input data.

The present embodiments improve the accuracy in filtering input data as compared to using fixed filters. This improvement is, though, achieved with far less computational complexity in determining the adaptive filter as compared to prior art adaptive filters having one and the same level of adaptivity for all filter coefficients. The adaptive filter of the embodiments therefore has high accuracy and adaptivity in the filter tap/parameter or those filter taps/parameters having the largest impact on the filtered result and instead uses lower accuracy and adaptivity for less significant filter taps/parameters.

Other advantages offered will be appreciated upon reading of the below description of the embodiments.

SHORT DESCRIPTION OF THE DRAWINGS

The embodiments together with further objectives and advantages thereof, may best be understood by making reference to the following description taken together with the accompanying drawings, in which.

DETAILED DESCRIPTION

Figure 1:
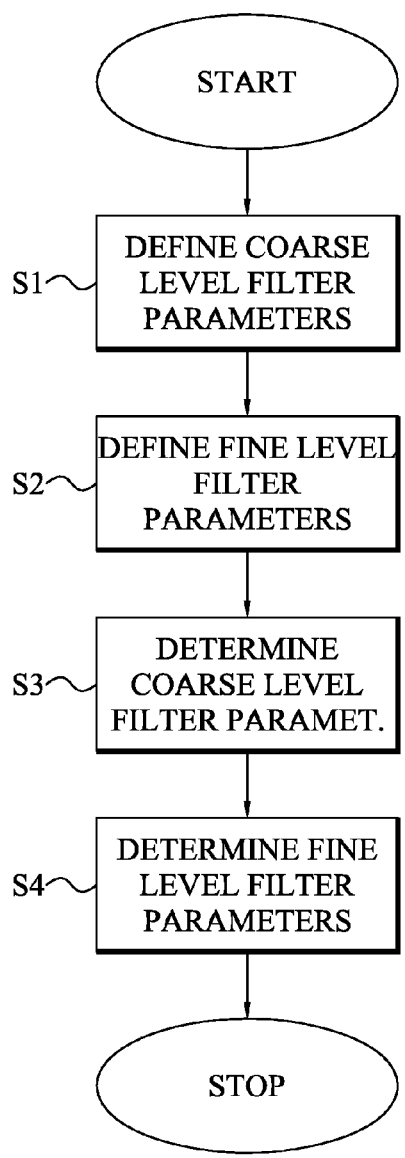
FIG. 1 is a flow diagram illustrating a method of determining an adaptive filter according to an embodiment.

Throughout the drawings, the same reference characters will be used for corresponding or similar elements.

The present embodiments are directed towards adaptive filters having different levels of adaptivity among the filter parameters. This means that filter parameters having a large impact on the filtered result and are therefore of high importance have a fine level of adaptivity, while other filter parameters that are less relevant for the filtered result can have a lower or coarser level of adaptivity. A trade-off between filtering efficiency and complexity is therefore exploited by putting the complexity into those filter parameters that are important and reducing the complexity for other filter parameters. For instance, as not all property values that are filtered by an adaptive filter have the same importance, the overall complexity of the adaptive filter determination and the application of the adaptive filter can be significantly reduced while still achieving sufficient efficiency and quality through application of the differentiated adaptivity in the filters of the present embodiments.

The determination and usage of the adaptive filters of the present embodiments are therefore much simplified in terms of processing complexity as compared to the prior art adaptive filters. However, even with this reduction in complexity, the quality of the filtered output is still very high.

FIG. 1 is a flow diagram illustrating a method of determining an adaptive filter having multiple filter parameters according to an embodiment. The method starts in step S1, which defines at least one filter parameter of the multiple filter parameters as having a first level of adaptivity. In the following, this first level of adaptivity is, non-limitedly, defined as being a coarse adaptivity level as compared to a second level of adaptivity, which then is regarded as constituting a fine level of adaptivity. At least one filter parameter having the second, fine level of adaptivity is defined in step S2. In an alternative implementation, the first level of adaptivity is finer than the second level of adaptivity.

Generally, a filter is defined by its filter parameters. For instance, a filter has a number of taps constituting the filter coefficients of the filter. A filter can be one-dimensional, i.e. being a T-tap filter having T filter taps and coefficients, where T is an integer value equal to or larger than two. Correspondingly, two-dimensional filters have $T_1 \times T_2$ filter taps and can therefore be applied to a block of input data elements, were $T_1, T_2$ independently is an integer value equal to or larger than two. In addition to filter taps a filter may have a scaling factor that can be added to the filtered output to achieve a scaling of the filtered data. Thus, filtering a set of input data elements with a T-tap filter may be described as $[I_1 h_1 + I_2 h_2 + \ldots + I_T h_T + F_S + 2^{N-1}] \gg N$, where $I_{1-T}$ defines the T input data elements, $h_{1-T}$ denotes the T filter coefficients of the filter, $F_S$ is the scaling factor, $2^{N-1}$ is a, typically fixed, rounding factor, N is a pre-defined integer and $\gg$ denotes the right shift operation.

As used herein, "filter parameter" therefore encompasses different elements of an adaptive filter used for defining the particular adaptive filter. Such a filter parameter may therefore be a filter tap of the adaptive filter. Another example is the scaling factor of the adaptive filter. In such a case, step S1 and S2 may, for instance, define the scaling factor as the coarse level filter parameter and all or a subset of the filter taps as being the filter parameter of fine level of adaptivity. Alternatively, step S1 may define a subset of the filter taps as constituting the filter parameter of the coarse level of adaptivity while step S2 defines another subset of the filter taps as being the finely adaptive filter parameters.

In the following the embodiments are mainly discussed in connection with using filter taps as the filter parameters of the adaptive filter. This should, however, be seen as a preferred, but not limiting disclosure of the present embodiments and other types of filter parameters, such as scaling factor, may alternatively or in addition be used.

The defining steps S1 and S2 define, in an embodiment, both the number of filter taps designated for each level of adaptivity and which particular filter taps in the adaptive filter that should have the respective level of adaptivity. In a preferred implementation, this tap definition of steps S1 and S2 is at least partly performed based on the particular input that is to be filtered by the adaptive filter. For instance, if the adaptive filter is to be applied to a set of multiple reference pixels in a pixel block to get an interpolated pixel as filtered output, the relative positions of the reference pixels in the filtering with the adaptive filter define the particular relevance of the reference pixels in the determination of the interpolated pixel. Those reference pixel positions that are deemed more important, typically but not always, the central or middle positions of the adaptive filter should be filtered with filter coefficients having a high level of adaptivity and accuracy to thereby increase the accuracy in the filtered output. This means that those filter taps that corresponds to reference pixel positions of high importance are defined as having fine level of adaptivity in step S2, while other less important reference pixel positions, typically more distant from the center of the adaptive filter, should be filtered with filter taps having a coarse level of adaptivity and accuracy.

In typical embodiments, the particular adaptivity level of the different filter taps in the adaptive filter is therefore selected based on the particular input data to be filtered. In these embodiments, the definition of which filter taps that should have coarse and fine level of adaptivity, respectively, is therefore fixed for a particular input data type.

However, another embodiment provides an adjustment in the definition of the level of adaptivity for the filter taps. Thus, the particular distribution of fine and coarse level adaptivity filter taps in the adaptive filter can be dynamically determined in an optimization procedure. There is then no fixed, pre-defined distribution of fine and coarse filter tap positions in the filter.

Thus, the definition of filter parameters according to steps S1 and S2 can be conducted according to different embodiments. The common characteristics of these embodiments are that at least one filter parameter of the adaptive filter has a first, coarse, level of adaptivity, while at least one other filter parameter has a second, fine, level of adaptivity.

This division of filter parameters, such as filter taps, into different levels of adaptivity can of course be extended to have more than two levels of adaptivity. For instance, with three different levels of adaptivity, at least one filter parameter, such as filter tap or scaling factor, has a first, coarse level of adaptivity, at least one filter parameter, such as another filter tap, has a second, medium level of adaptivity, while at least one filter parameter, such as a further filter tap, has a third, fine level of adaptivity. The multiple, i.e. at least two, levels of adaptivity can also be complemented with at least one filter parameter, such as filter tap, that has no adaptivity at all, i.e. being fixed. In such a case, the adaptive filter may, for instance, comprise m filter taps having the coarse level of adaptivity, n filter taps with the fine level of adaptivity and o filter taps that have fixed filter coefficients, where m, n, o is independently an integer equal to or larger than one. The determination of the adaptive filter can therefore only affect the m+n filter taps having an adaptivity and possibly any other adaptive filter parameter, while the o filter taps are not possible to adjust.

The two steps S1 and S2 can be conducted serially as illustrated in FIG. 1, though the particular order of the two steps can be interchanged. Alternatively, the two steps S1 and S2 are conducted parallel or even together in a common optimization or selection procedure.

A next step S3 determines the filter parameter value or values for the at least one filter parameter defined in step S1 and having the first, coarse level of adaptivity. These so-called coarse filter parameter values are preferably determined among a first set of allowable filter parameter values. In such a case, the level of adaptivity defines the size of the set. Thus, a finer level of adaptivity implies that the associated set contains more allowable filter parameter values as compared to a set assigned to a coarser level of adaptivity.

Step S4 correspondingly determines the filter parameter value or parameter values for the at least one filter parameter defined in step S2 and having the second, fine level of adaptivity. In similarity to step S3, step S4 preferably determines the filter parameter values among a second set of allowable filter parameter values. This second set comprises N filter parameter values, while the first set comprises M filter parameter values. In order to provide the different levels of adaptivity N is larger than M. In the case of filter parameters in form of filter taps, step S3 determines the filter coefficient or coefficients for the filter tap or taps of the adaptive filter having the coarse level of adaptivity, while step S4 determines the filter coefficient or coefficients for the filter taps or taps having the fine level of adaptivity.

The two sets of filter parameter values can be defined according to different embodiments. For instance, a respective parameter table can be provided for each level of adaptivity. The tables then contain the particular allowable filter parameter values. The determination of filter parameter values in steps S3 and S4 therefore involves selecting filter parameter values from respective parameter table.

Alternatively, the set can define a range of allowable filter parameter values that can be represented with the limited parameter value resolution, in terms of number of bits, which is available for the adaptive filter. In such a case, the first set can contain parameter values in a first interval $[\alpha,\beta]$, while the second set includes parameter values in a second interval $[\chi,\delta]$, where $\chi \leq \alpha$ and $\beta \leq \delta$, with the proviso that if $\chi=\alpha$ then $\beta<\delta$ and if $\beta=\delta$ then $\chi<\alpha$.

A further embodiment also uses an interval or range of parameter values, $[\alpha,\beta]$. However, in this embodiment the same interval is available for both levels of adaptivity. In such a case, the resolution in representing the filter parameter values for the coarse level of adaptivity may be lower than the resolution in representing filter coefficients with high level of adaptivity. Thus, if the resolution for a particular level of adaptivity is B bits, this means that $2^B$ different parameter values in the interval $[\alpha,\beta]$ is available. These $2^B$ parameter values preferably include the end values of the interval, i.e. $\alpha$ and $\beta$, and $2^B-2$ intermediate coefficient values calculated as different weighted or linear combinations of the two end values. In this approach the resolution $B_1$ for the coarse level of adaptivity is smaller than the resolution $B_2$ of the fine level of adaptivity.

In yet another implementation, the same interval of parameter values, $[\alpha,\beta]$, is available for the different levels of adaptivity as above. However, in this case the coarse level of adaptivity can only select M predefined parameter values in the interval, while N predefined coefficient values are available for the fine level of adaptivity, with M<N.

A further embodiment has a first set of M predefined filters and a second set of N predefined filters. The first set contains M filters having different combinations of filter coefficients for the filter taps in the adaptive filter that have coarse level of adaptivity. Remaining filter taps, if any, preferably have fixed filter coefficients and are more preferably equal to zero. Correspondingly, the second set comprises N filters having different combinations of filter coefficients for the filter taps defined to have fine level of adaptivity in the adaptive filter. The other filter taps, if any, have predefined, preferably zero, filter coefficients. A so-called coarse filter from the first set is then combined with a fine filter from the second set to provide the adaptive filter. This is equivalent to convolve the filter input with the coarse filter to get a first filter output and convolve the filter input with a fine filter to get a second filter output and then sum the two filter outputs.

For instance, assume that the adaptive filter is defined as $[f_1\ a_1\ a_2\ f_2]$, where $f_{1,2}$ denotes filter coefficients having the coarse level of adaptivity and $a_{1,2}$ indicates filter coefficients with fine level of adaptivity. In such a case, the first filter set comprises M coarse filters, $[f_1\ 0\ 0\ f_2]$, where each of these M has a unique combination of the filter coefficients $f_1$ and $f_2$. The second filter set comprises N predefined fine filters, $[0\ a_1\ a_2\ 0]$, having different combinations of the filter coefficients $a_1$ and $a_2$.

The filter coefficients of the coarse and/or fine adaptivity level can be in the form of x/y, where x is zero or a positive or negative number, preferably integer, and y is a non-zero normalization factor. The adaptivity of the filter coefficients can be conducted by having different values x available for the coarse and fine level of adaptivity. In addition, or alternatively, the normalization factor y could be varied to achieve different filter coefficients. This normalization factor is highly connected to the representation accuracy of the filter coefficients. Generally, if fine tuning of the filter coefficients is needed, large normalization factors are typically used. Different filter characteristics can therefore be obtained by using varying normalization factors.

The determination of the coarse level filter parameter values in step S3 and the determination of the fine level filter parameter values in step S4 may be performed by optimization of different optimization criteria. In such a case, a first optimization criterion is applied regarding the coarse level filter parameter values, while a second, different optimization criterion is used for the fine level parameter values. Examples of such different optimization criteria are discussed further herein in connection with FIGS. 2 to 5 below.

Steps S3 and S4 may be conducted serially as illustrated in the figure, though the order of steps S3 and S4 may be interchanged. Alternatively, steps S3 and S4 can be conducted in parallel or even in a common coefficient determination procedure. In a particular embodiment, step S3 is conducted first by determining the coarse level filter parameter values according to the first optimization criterion. Step S4 is then performed following the determination of the coarse level filter parameter values. This embodiment therefore determines the filter parameter values with high accuracy based on the constraints of the filter parameter values with low accuracy. The method then ends.

Figure 2:
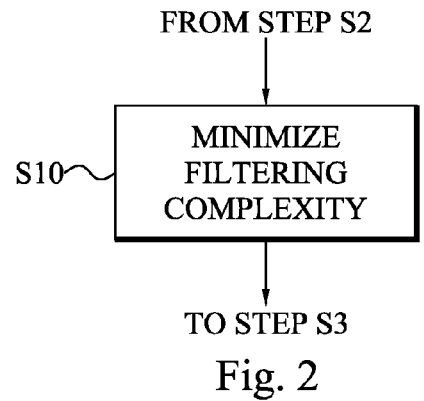
FIG. 2 is a flow diagram illustrating an additional, optional step of the filter determining method in FIG. 1.

FIG. 2 is a flow diagram illustrating an additional, optional step of the filter determining method of FIG. 1. In this embodiment, the determination of the coarse level filter coefficients is performed in step S10 according to the optimization criterion of minimizing or at least reducing the complexity of the filtering operation. Thus, the coefficient values or parameter values for the coarse level filter taps or filter parameters are selected from the coarse set of filter coefficients or parameter values with the purpose of reducing the complexity in filtering input data with the adaptive filter.

Examples of such complexity minimization in step S10 is to select the coefficient values to avoid multiplications in favor of additions and/or shifts during the filtering. For instance, the coarse set of filter coefficients could include the coefficient values $$-\frac{1}{2^L}, 0, \frac{1}{2^L},$$

where $2^L$ is a normalization factor and L is zero or a positive integer. The, preferably fixed, normalization factor is typically performed as the last operation in filtering with fixed point arithmetic. In such a case, the usage of these filter coefficients for the coarse filter taps limits filter operations to additions of input data for these coarse positions if the smallest quantization step size for coding a filter parameter is a multiple of $$\frac{1}{2^L}.$$

Otherwise the filter operations are performed as shifts which are still significantly computationally more efficient that performing multiplications.

Once the optimization criterion, i.e. minimizing filtering complexity, has been met in step S10, the method continues to step S3 of FIG. 1, where the filter coefficients for the filter taps with coarse adaptivity are determined based on the criterion.

Figure 3:
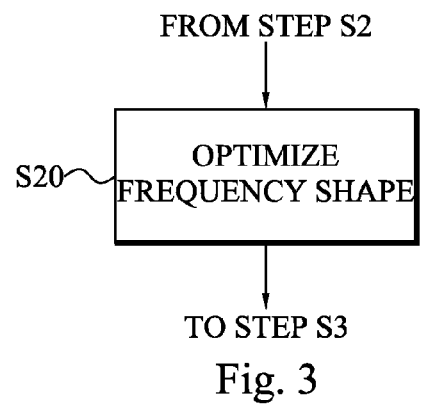
FIG. 3 is a flow diagram illustrating an additional, optional step of the filter determining method in FIG. 1.

Another objective or optimization criterion for the filter taps or filter parameters with coarse level of adaptivity is to optimize the frequency shape of adaptive filter as is illustrated in the additional step S20 of FIG. 3. Frequency shape optimization implies that the adaptive filter can be used for achieving more or less lowpass filtering. This allows removal of noise, which is typically present in the high frequency domain. The particular lowpass level of the adaptive filter therefore depends on the quality of the input data and in particular the noise present therein. Step S20 therefore optimizes the frequency shape of the adaptive filter by determining the coarse level filter coefficients or parameter values in step S3 to achieve a desired lowpass filtering characteristic of the adaptive filter. Lowpass filtering characteristics of an adaptive filter may be adjusted by the usage of an adaptive scaling factor as is further disclosed further below.

Figure 4:
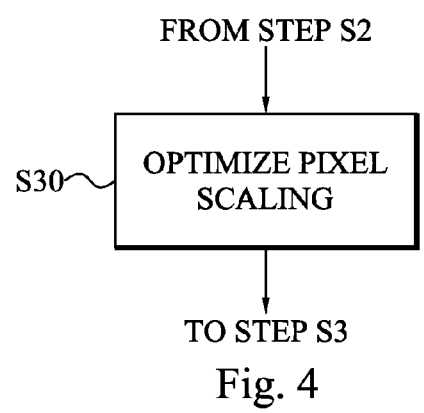
FIG. 4 is a flow diagram illustrating an additional, optional step of the filter determining method in FIG. 1.

FIG. 4 illustrates yet another optimization criterion that can be used for the coarse level of adaptivity. The method continues from step S2 of FIG. 1. A next step S30 optimizes the scaling to be applied to the different input values to be filtered or the filtered data to thereby achieve a change of the average value of the input data to be filtered, such as reference pixel block, depending on the value of the coarse level filter tap or filter parameter. The change of the average value of the reference pixel block can be addressed as an additive or a multiplicative scaling factor to be included to the filtering with filter taps of fine level of adaptivity. Step S3 of FIG. 1 then determines the coarse level filter tap to have a value that achieves this selected or optimized pixel value scaling. The additive scaling factor can for example be estimated as the difference between the average value of one or several original pixel blocks and the average value of one or several corresponding reference pixel blocks. If the scaling is multiplicative, the scaling factor can be estimated as the ratio between the average value of one or several original pixel blocks and the average value of one or several corresponding reference pixel blocks.

Figure 5:
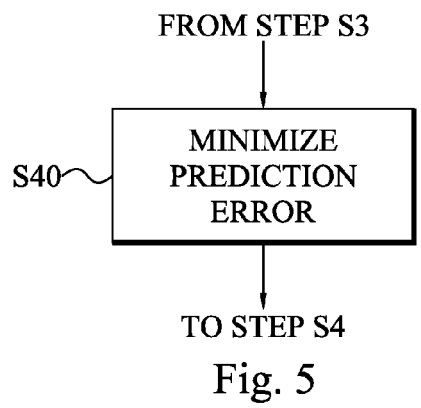
FIG. 5 is a flow diagram illustrating an additional, optional step of the filter determining method in FIG. 1.

FIG. 5 illustrates an embodiment of the optimization criterion to use for the filter taps or filter parameters with fine level of adaptivity. This embodiment is particularly suitable to use when filtering reference pixels for the purpose of determining a prediction of original pixel property values. In such a case, the optimization criterion is preferably to minimize the prediction error between one or several original pixel blocks and one or several predicted pixel blocks obtained by filtering the reference pixel block with the adaptive filter:

$$E^2 = \sum_n \left(S_n - \sum_i P_{n-1} AF_i\right)^2$$

where S is the original pixel block, P is the reference pixel block and AF is the adaptive filter. After taking the derivate of $E^2$ with respect to the fine level filter coefficients and set the result to 0, the fine level filter coefficients can be determined. The particular coefficient values for the filter taps with fine level of adaptivity are then determined in step S4 of FIG. 1 according to the minimization of the prediction error in step S40.

The adaptive filter of the present embodiments is preferably determined, as disclosed in FIG. 1, in an encoder and can then be used in connection with coding and decoding input data. For instance, the adaptive filters as disclosed herein can be used in both inter (including bi-directional) and intra coding. In such a case, in inter coding the adaptive filter can be used for filtering the reference pixel block or inter prediction of a current pixel block to be encoded/decoded. Correspondingly, in intra coding, the adaptive filter can be used for filtering reference pixels that are used as intra prediction of a current pixel block to be encoded/decoded. In addition, in both intra and inter coding, the adaptive filter disclosed herein can be used for pre- and/or post filtering and/or loop filtering.

Figure 6:
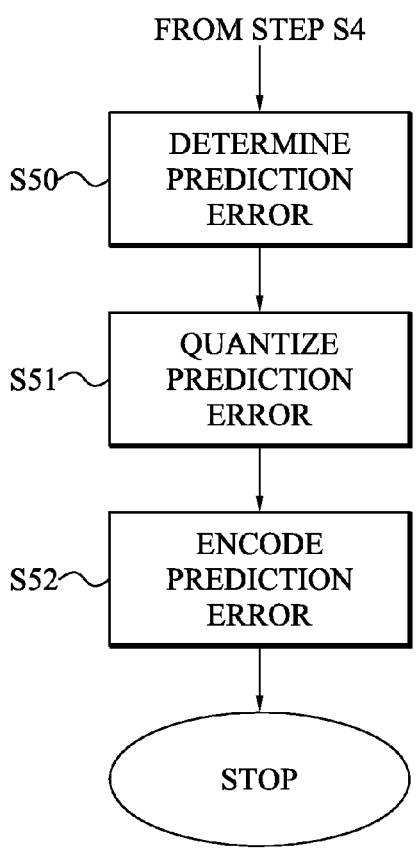
FIG. 6 is a flow diagram illustrating additional, optional steps of the filter determining method in FIG. 1.

In these applications of the adaptive filter, the filter is preferably determined by the encoder in connection with the coding process. The determined adaptive filter is then signaled to the decoder together with the coded data. The decoder can use the signaled data descriptive of the adaptive filter and apply it during the decoding process. In such a case, the filter coefficients of the adaptive filter can be sent in unquantized and uncoded form. However, in order to reduce the overhead in signaling the information of the adaptive filter, a quantization and encoding procedure as is illustrated in FIG. 6 is preferably conducted.

The method continues from step S4 of FIG. 1. A next step S50 determines, for each filter coefficient of the adaptive filter, a prediction error of the filter coefficient based on a respective coefficient prediction from a reference filter. This step S50 can therefore be implemented by calculating respective differences between filter coefficient of the adaptive filter and the filter coefficient, i.e. the coefficient prediction, of the reference filter; $pe_j = AF_j - RF_j$, where pe denotes the prediction error, AF represents the adaptive filter, RF indicates the reference filter and j is the index to a particular filter tap.

The reference filter is preferably a pre-defined filter available to both the encoder and the decoder. In a typical implementation, the reference filter is a Wiener filter. Alternatively, the reference filter can be the adaptive filter determined in the case of bloc-specific adaptive filters for a previous pixel block in the frame in connection with encoding of pixel blocks during an inter or intra prediction based coding. If frame or slice specific adaptive filters are used, the reference filter can be the adaptive filter determined for a previous frame or slice of the video sequence.

A next optional step S51 quantizes the determined prediction errors. There are several different quantization procedures known in the art and which can be used in step S51. For instance, the prediction errors can be shifted bitwise L steps to the right to get a quantized prediction error; $pe_q = pe \gg L$. Another quantization embodiment is to divide the prediction errors with a value $2^L$. This is, however, actually the same as shifting the prediction error bitwise L steps to the right. In an alternative approach the divisor does not necessarily have to be a power of two but other non-zero integers and non-integer numbers could alternative be used.

Usually adaptive filter coefficients are determined with floating point arithmetic, such as half, i.e. floating point 16 (fp16), float, i.e. floating point 32 (fp32), or double, i.e. floating point 64 (fp64). The prediction error for one coefficient is, thus, typically floating point but it could be in fixed point with high accuracy. In such a case, the quantization of the floating point can be conducted by calculating a respective index for each filter tap:

$$\text{index} = \text{sign} \times \text{int}\left(\frac{\text{abs}(pe)}{\text{step}} + 0.5\right)$$

where $$\text{step} = \frac{1}{2^{N-1}},$$

sign represents the sign of the prediction error and is −1 if negative and else +1. The precision of the floating point prediction error, pe, is N−1 bits +1 sign bit. The index is encoded in step S52. The reconstructed prediction error is then sign×index×step. When this reconstructed prediction error is added to the reference filter coefficient the filter coefficient is achieved.

The quantized prediction errors are then encoded in step S52 to get a coded representation of the adaptive filter. Different encoding algorithms can be used in this step S52, such as different types of entropy encoders including, but not limited to, context-adaptive binary arithmetic coding (CABAC), context-adaptive variable length coding (CAVLC), Golomb-Rice, Huffman or Tunnstall, which are all well-known in the art and are therefore not further discussed herein.

In this entropy encoding, more probable and shorter indices, in terms of number of bits, generally gives shorter codewords than longer, less probable indices.

The coded representation of the filter is then associated with the, inter or intra, coded data and can be transmitted further to a decoder.

Another embodiment of signaling the adaptive filter of the present invention is to use table indices. As previously described a first table can contain the set of available filter coefficient values for the filter taps with coarse level of adaptivity and a second table comprises the coefficient values for the filter taps with fine level of adaptivity. In such a case, each filter tap having a level of adaptivity can be assigned one coefficient index and optionally one table index. The table index could be a 1-bit index in the case of two levels of adaptivity, i.e. coarse and fine, or a 2-bit index in the case of three or four levels of adaptivity, i.e. zero adaptivity, coarse, medium and fine. This index points to the particular table of the at least first table and second table to use for a given filter tap position. If the distribution of coarse and fine adaptive filter taps is predefined, no table indices are needed. The coefficient index is associated with one of the multiple coefficient values in the relevant table. The adaptive filter can therefore be signaled in the form of multiple such table and coefficient indices. This embodiment is particularly efficient if the respective numbers of available coefficient values for the fine and coarse levels is fairly small.

Figure 7:
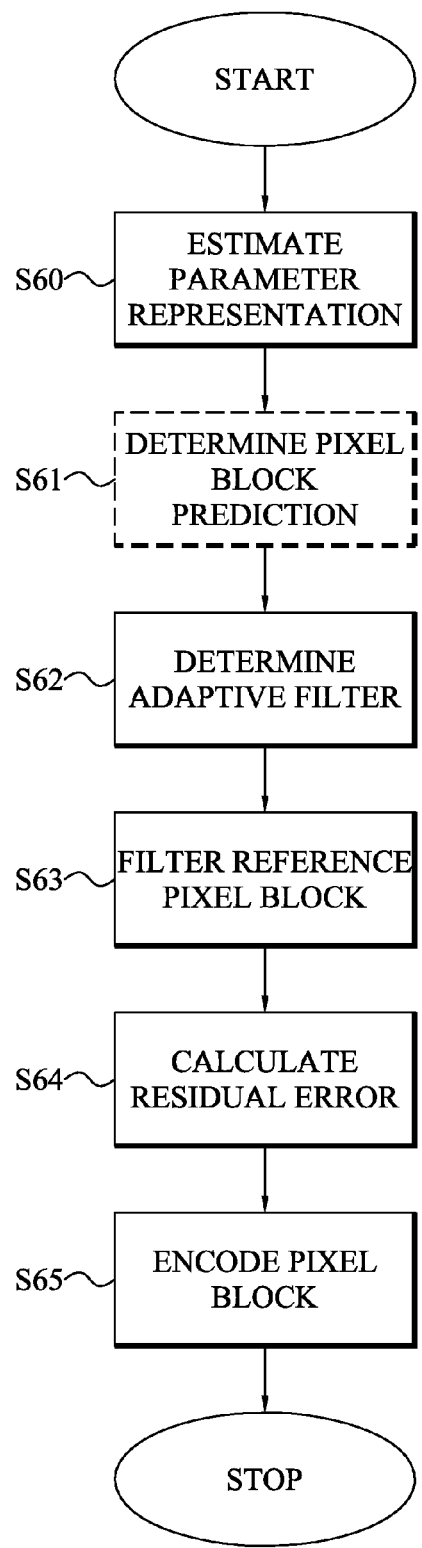
FIG. 7 is a flow diagram illustrating a method of encoding a pixel block using an adaptive filter according to an embodiment.

FIG. 7 is a flow diagram illustrating a method of encoding a pixel block in a frame of an image or video sequence using an adaptive filter.

Figure 10:
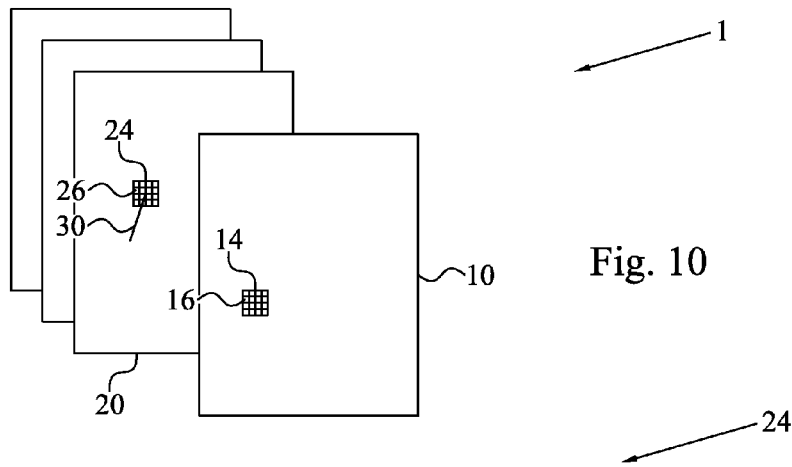
FIG. 10 is a schematic illustration of a video sequence of frames.

With reference to FIG. 10, a video sequence 1 comprises multiple, i.e. at least two, frames or pictures 10, 20. Such a frame 10, 20 can in turn be regarded as composed of a series of one or more slices, where such a slice consists of one or more macroblocks 14, 24 of pixels or image element 16, 26. Such a pixel 16, 26 has associated property value, such as color, in the red, green, blue, RGB, space, or luminance (Y) and chrominance (Cr, Cb or sometimes denoted U, V).

The pixels 16, 26 are organized into groups or blocks 14, 24 of pixels 16, 26. The expression "pixel block" 14, 24 denotes any of the prior art known partitions of frames 10, 20 and slices into collections of pixels 16, 26 that are handled together during decoding and encoding. Generally, such a pixel block 14, 24 is a rectangular, R×T, or square, R×R, block of pixels 16, 26. An example of such a grouping is a macroblock in the video compression standard. Such a macroblock generally has a size of 16×16 pixels 16, 26. A macroblock can consists of multiple so-called sub-macroblock partitions, such as 16×8, 8×16, 8×8, 8×4, 4×8 and 4×4 pixels 16, 26. The 8×8 sub-macroblock partition is often denoted as a sub-macroblock or sub-block, whereas a 4×4 partition is often denoted block.

A first step S60 of FIG. 7 estimates a parameter or displacement representation associated with or pointing towards a reference pixel block. This reference pixel block or more correctly reference property values of the pixels in the pixel block are to be used in the coding of the property values of the pixels in the current pixel block.

This estimation of step S60 typically involves the use of fixed interpolation filters, such as described below in connection with step S61 and FIG. 11. The parameter representation includes a motion vector with sub-pel accuracy in inter prediction.

As is illustrated in FIG. 10, the parameter representation can refer to the reference pixel block 24 in another frame or reference frame 20 in the video sequence 1 for the purpose of performing an inter coding of the pixel block 14. Such a displacement representation then comprises an identifier of the reference frame 20, unless this is pre-defined, such as using the most previous coded frame i−1 in the video sequence 1 as reference frame 20 for pixel blocks 14 in the current frame i 10. Furthermore, the representation comprises a so-called displacement or motion vector 40 determining the position of the reference pixel block 24 in the reference frame 20 relative the corresponding pixel block position, the current pixel block 14 occupies in the current frame 10. The estimation generally involves performing a parameter estimation that can be conducted according to prior art techniques, such as described in [1, 4, 6-7]. Briefly, a number of candidate reference pixel blocks in one or more candidate reference frames are investigated for determining which of these candidate reference pixel blocks that has pixel property values that best, in some sense, matches the pixel property values of the current pixel block 14 to be encoded. The error criterion used in this pixel block search can be the sum of the absolute difference (SAD) of the property values in the candidate pixel block and the current pixel block or sum of squared difference (SSD) as illustrative examples of error criteria.

Figure 12:
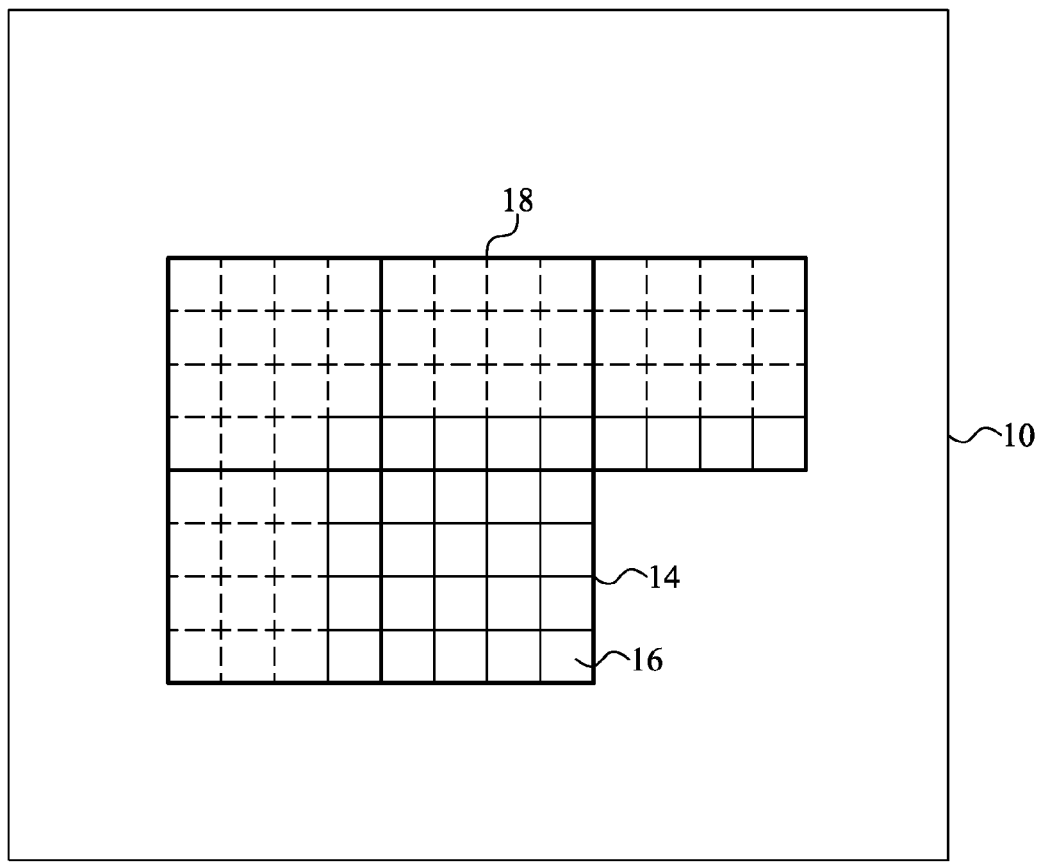
FIG. 12 is a schematic illustration of a frame in a video sequence.

Alternatively and as is illustrated in FIG. 12, the parameter representation can refer to a reference pixel block 18 in the same frame 10 as the current pixel block 14 in the case of intra coding. Intra-coding can be performed according to different prediction modes associated with different prediction directions. In such a case, the displacement representation defines one of the available prediction modes or directions. The estimation can be performed according to well-known techniques, such as disclosed in [1, 8]. Briefly, a rate distortion optimization technique can be used for determining, based on the property values of the current pixel block 14, which the intra predictions that gives best, in some sense, rate distortion performance.

A next optional step S61 determines a pixel block prediction of the current pixel block based on the reference pixel block identified in step S60. In an implementation, the reference pixel block can be used directly as pixel block prediction. However, in other applications increased accuracy in the prediction can be achieved by allowing sub-pel property values. In such a case, the pixel block prediction is determined in step S61 by filtering the pixel property values of the reference pixel block with one or more interpolation filters. Step S61 therefore provides an interpolation filter or a set of interpolation filters that is applicable to the property values of at least a portion of the pixels in the identified reference pixel block. Such interpolation filters are applicable to pixels to obtain sub-pel or fractional-pel property values. For instance, one or more interpolation filters can be applied to a set of property values in the reference pixel block to obtain half-pel (½), quarter-pel (¼) or even eighth-pel (⅛) resolution. As is well known in the art, a first interpolation filter can be provided for obtaining a first level of sub-pel resolution, such as half-pel resolution. A second interpolation filter, such as a bilinear filter, can then be applied to a half-pel pixel value and its neighboring full pixel value to obtain a second level of sub-pel resolution, such as quarter-pel resolution.

The interpolation filter(s) provided in step S61 can be fixed filters, such as the interpolation filters utilized in H.264. In H.264 a filter having filter coefficients [1 −5 20 20 −5 1]/32 is first applied for obtaining half-pel values followed by a bilinear filter for quarter-pel resolution.

It is anticipated by the invention that the at least one interpolation filter used for determining the pixel block prediction in step S61 could be non-separable, 2-dimensional, filter, i.e. filtering both in the vertical and the horizontal direction. Alternatively, separable vertical and horizontal interpolation filters are used in the interpolation procedure.

In an alternative implementation no fixed interpolation filters are used and step S61 is omitted. In clear contrast, the adaptive filter as disclosed herein is used as an adaptive interpolation filter. In such case, the reference pixel block is filtered with at least one adaptive interpolation filter to determine the pixel block prediction in step S63.

Figure 11:
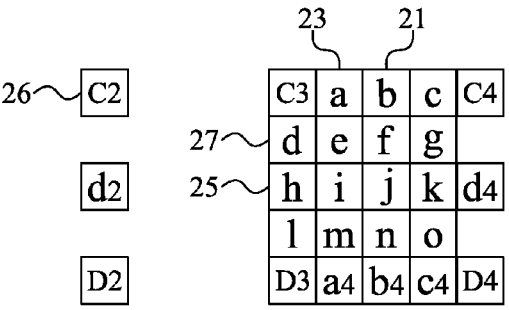
FIG. 11 is an illustration of a pixel block and interpolated sub-pel pixels.

FIG. 11 schematically illustrates the generation of an interpolated pixel block prediction using a determined reference block 24 in the reference frame and also some values of neighboring pixel blocks in the reference frame. The figure illustrates the concept of interpolating half-pel and quarter-pel values based on the full-pel pixel values. In the figure, full-pel values are denoted with upper-case letters, while sub-pel values are denoted with lower-case letters.

In the illustrated figure, 6-tap interpolation filters are assumed. In a first embodiment, such a filter is first applied row by row to calculate the values b1, b2, b, b4 to b6. The same filter or another interpolation filter can then applied column by column to obtain the values d1 to d2, h and d4 to d6. This filter can also be used on the column formed by b1, b2, b, b4 to b6 to calculate j. All these values are half-pel values. A bilinear filter can then be applied at already calculated half-pel positions and existing full-pel positions to get the quarter-pel values a, c, d, e, f, g, i, k, l, m, n, and o.

Alternatively, three separate 6-tap horizontal filters can be used and applied to C1 to C6 for calculating the half- 21 and quarter-pel 23 values a, b and c. The same horizontal filters are also preferably applied to the rows to obtain the values $a_i$, $b_i$ and $c_i$, where i=1, 2, 4, 5, 6. 12 vertical interpolation filters can then be applied on the columns A3-F3, a1-a6, b1-b6, c1-c6, three filters per column, to calculate the remaining half- 25 and quarter-pel 27 values. The block formed by the pixel values C3, a-o then forms an interpolated prediction of the current pixel block.

Figure 13:
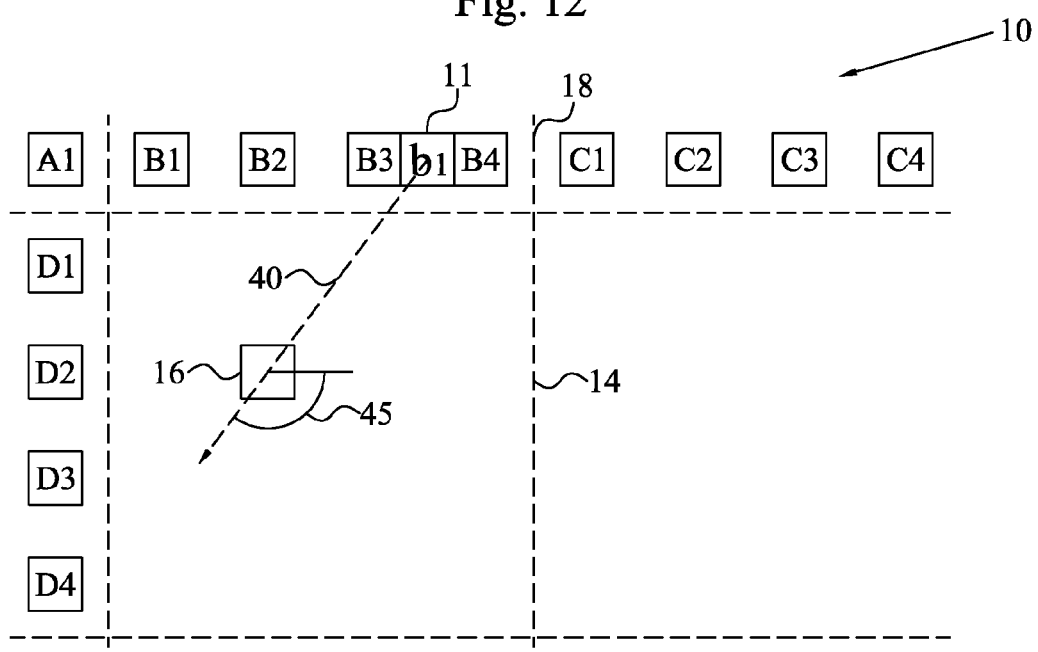
FIG. 13 is an illustration of a pixel block intra-coded to sub-pel resolution.

FIG. 13 is a schematic drawing of a portion of a frame 10 having multiple pixel blocks 14, 18. In intra prediction, a reference pixel block consists of pixels from one or more neighboring pixel blocks 18 in the same frame 10. Which neighboring pixel block 18 the pixel values are fetched from depends on the displacement representation assigned to the current block 14. FIG. 13 illustrates this concept together with intra interpolation. In this case, a prediction for the pixel value of a pixel 16 in the block 14 is an interpolated value 11 from a pixel block 18 positioned diagonally above the current pixel block 14. The vector 40 illustrates the prediction direction used in the intra prediction. In such a case, there may be different sets of available intra predictions and displacement representations according to Table I below:

TABLE I

| Mode index | Intra prediction directions | | | | |
| --- | --- | --- | --- | --- | --- |
| | Intra prediction set | | | | |
| | 0 | 1 | 2 | 3 | 4 |
| 0 | −90° | −90° | −90° | −90° | −90° |
| 1 | 0° | 0° | 0° | 0° | 0° |
| 2 | DC | DC | DC | DC | DC |

TABLE I-continued

| | Intra prediction directions | | | | |
|---|---|---|---|---|---|
| Mode | Intra prediction set | | | | |
| index | 0 | 1 | 2 | 3 | 4 |
| 3 | −45° | −5° | −85° | −10° | −80° |
| 4 | −135° | 5° | −95° | 10° | −100° |
| 5 | −112.5° | −15° | −75° | −20° | −70° |
| 6 | 22.5° | 15° | −105° | 20° | −110° |
| 7 | −67.5° | −30° | −60° | −40° | −50° |
| 8 | −22.5° | 30° | −120° | 40° | −130° |

The numbers listed in Table I refers to the angle 45 of the intra prediction vector 40 relative the horizontal axis. For the intra prediction directions of sets 1-4, pixel interpolation may be required.

A next step S62 determines at least one adaptive filter according to the present embodiments as previously described herein. This at least one adaptive filter is preferably applied to pixel property values of the reference pixel block in step S63 to thereby provide filtered pixel property values.

In an implementation of the adaptive filters for inter prediction, the adaptive filters are optimized on slice or frames basis for respective sub-pel position a-o or for sets of sub-pel positions. This then means that step S62 can be performed before any of the previous steps S60 and S61 and indeed be conducted separately for the current slice or frame.

In either case, the filtering of the reference pixel block with the determined adaptive filter, either determined for the current pixel block or optimized for a higher level, such as for a slice or frame, in step S63 can be seen as a refinement of the parameter estimation from step S60 using the adaptive filter.

A residual error is calculated in step S64 based on the property values of the current pixel block to be coded and the filtered property values of the reference pixel block from step S63. More preferably, the prediction error is calculated as the difference between the current pixel block and the reference pixel block filtered with at least one adaptive filter. If step S61 is performed, the residual error is preferably calculated in step S61 based on the property values of the current pixel block to be coded, the property values of the pixel block prediction from step S61, the property values of the reference pixel block from step S60 and the adaptive filter determined in step S62. More preferably, the prediction error is calculated as the difference between the current pixel block and the pixel block prediction and the reference pixel block filtered with at least one adaptive filter.

The current pixel block is then encoded in step S65 as a representation of the displacement representation and a representation of the residual error. The encoded representation of the pixel block preferably also comprises the representation of the adaptive filter as previously described. Alternatively, the adaptive filter representation can be sent on frame or slice basis. The adaptive filter representation can also be specific for each parameter representation or set of parameter representations e.g. sub-pel position a-o in FIG. 11 or intra prediction directions in Table I.

The method then ends.

Adaptive Filter Examples

If interpolation of a reference pixel block is performed in one direction, an embodiment of an adaptive filter having filter taps of different levels of adaptivity could be a 6-tap filter $[f_1\ f_2\ a_1\ a_2\ f_2\ f_1]$, where $f_1$ denotes the filter coefficient for filter tap 1 and 6 having the coarse level of adaptivity, $f_2$ denotes the filter coefficient for filter tap 2 and 5 having the coarse level of adaptivity and $a_1$ and $a_2$ indicate the filter coefficients for filter taps 3 and 4 having the fine level of adaptivity. This kind of adaptive filter can displace reference pixel property values to better match target pixel property values, in particular by varying the values of $a_1$ and $a_2$. By varying the filter coefficients $f_1$ and $f_2$ the frequency shape of the adaptive filter can be changed. This kind of filter can also scale the reference pixel property values when the sum of all filter coefficients is different from one.

This embodiment of adaptive filter is useful for representing the sub-pel positions a, c, d, and l in the inter prediction and interpolation illustrated in FIG. 11.

Another example of adaptive filter is to use a 4×4 adaptive interpolation filter.

$$\begin{bmatrix} f_1 & f_2 & f_2 & f_1 \\ f_2 & a_1 & a_2 & f_2 \\ f_2 & a_3 & a_4 & f_2 \\ f_1 & f_2 & f_2 & f_1 \end{bmatrix}$$

In this adaptive filter, the central part of the filter is modeled with four filter taps having fine level of adaptivity, $a_1$, $a_2$, $a_3$ and $a_4$. This filter center is surrounded by filter taps having two different filter coefficients $f_1$ and $f_2$ with coarse level of adaptivity.

This adaptive filter can displace the reference pixels in both the horizontal and the vertical direction by having different values of $a_i$, i=1-4. By varying $f_1$ and $f_2$ the frequency shape of the adaptive filter can be varied. This kind of filter can also scale the reference pixel property values when the sum of all filter coefficients is different from one. The 4×4 adaptive filter is useful for representing sub-pel positions e, f, g, i, k, m, n and o in inter prediction and interpolation as illustrated in FIG. 11.

An alternative for the half-pel position j is to use a symmetric approach similarly as for b and h. In such a case, $a_i$, i=1-4 is replaced with $a_2$ and $f_2$ is replaced with $a_1$ in the 4×4 adaptive interpolation filter illustrated above.

A further example of adaptive filter for filtering in one direction is to use the 6-tap filter $[f_1\ a_1\ a_2\ a_2\ a_1\ f_1]$ with two fine adaptive filter coefficients $a_1$ and $a_2$ and a single coarse adaptive filter coefficient $f_1$. In this case, reference pixels can be smoothed or sharpened depending on the values of the filter coefficients. Such a filter is useful for representing sub-pel positions b and h in the inter prediction and interpolation of FIG. 11.

Still another example of adaptive filter is to the sparse 6×6 adaptive filter having 12 non-zero filter taps.

$$\begin{bmatrix} f_1 & 0 & 0 & 0 & 0 & f_1 \\ 0 & a_1 & 0 & 0 & a_1 & 0 \\ 0 & 0 & a_2 & a_2 & 0 & 0 \\ 0 & 0 & a_2 & a_2 & 0 & 0 \\ 0 & a_1 & 0 & 0 & a_1 & 0 \\ f_1 & 0 & 0 & 0 & 0 & f_1 \end{bmatrix}$$

The central part of the adaptive filter is modeled with two filter coefficients having the fine level of adaptivity $a_1$ and $a_2$. The corner filter taps have the same filter coefficient $f_1$ of the coarse level of adaptivity. In this case, the reference pixels can be smoothed or sharpened depending on the values of the filter coefficients. This adaptive filter is suitable for representing the sub-pel position j during inter prediction and interpolation as illustrated in FIG. 11.

Yet another example of adaptive filter for filtering in one direction is the 6-tap filter with an additive scaling factor [g $a_1$ $a_2$ $a_3$ $a_1$ g]+$f_1$. The 6-tap filter part is modeled with three filter coefficients with fine level of adaptivity $a_1$, $a_2$ and $a_3$. The 6-tap filter part is constrained to sum up to one, e.g. have no multiplicative scaling of reference pixel values since $$g = \frac{1 - a_1 - a_2 - a_3}{2}.$$

One filter parameter with coarse level of adaptivity $f_1$ makes additive scaling of the reference pixels possible. The additive scaling factor is used to adjust the prediction using the 6-tap filter part irrelevant of the values of the reference pixels. In fixed point implementation, the additive scaling factor is preferably applied before rounding and right shift of the result of the filtering with the 6-tap filter part.

Another example of adaptive filter for filtering in one direction is the 6-tap filter with a multiplicative scaling factor [g $a_1$ $a_2$ $a_3$ $a_1$ g]*$f_1$. The 6-tap filter part is modeled with three filter coefficients with fine level of adaptivity $a_1$, $a_2$ and $a_3$. The 6-tap filter part is constrained to sum up to one, e.g. have no multiplicative scaling of reference pixel values since $$g = \frac{1 - a_1 - a_2 - a_3}{2}.$$

One filter parameter with coarse level of adaptivity $f_1$ makes multiplicative scaling of the reference pixels possible. The multiplicative scaling factor is used to adjust the prediction using the 6-tap filter part dependent of the values of the reference pixels. The multiplicative scaling factor is preferably applied before filtering.

Figures 8, 9:
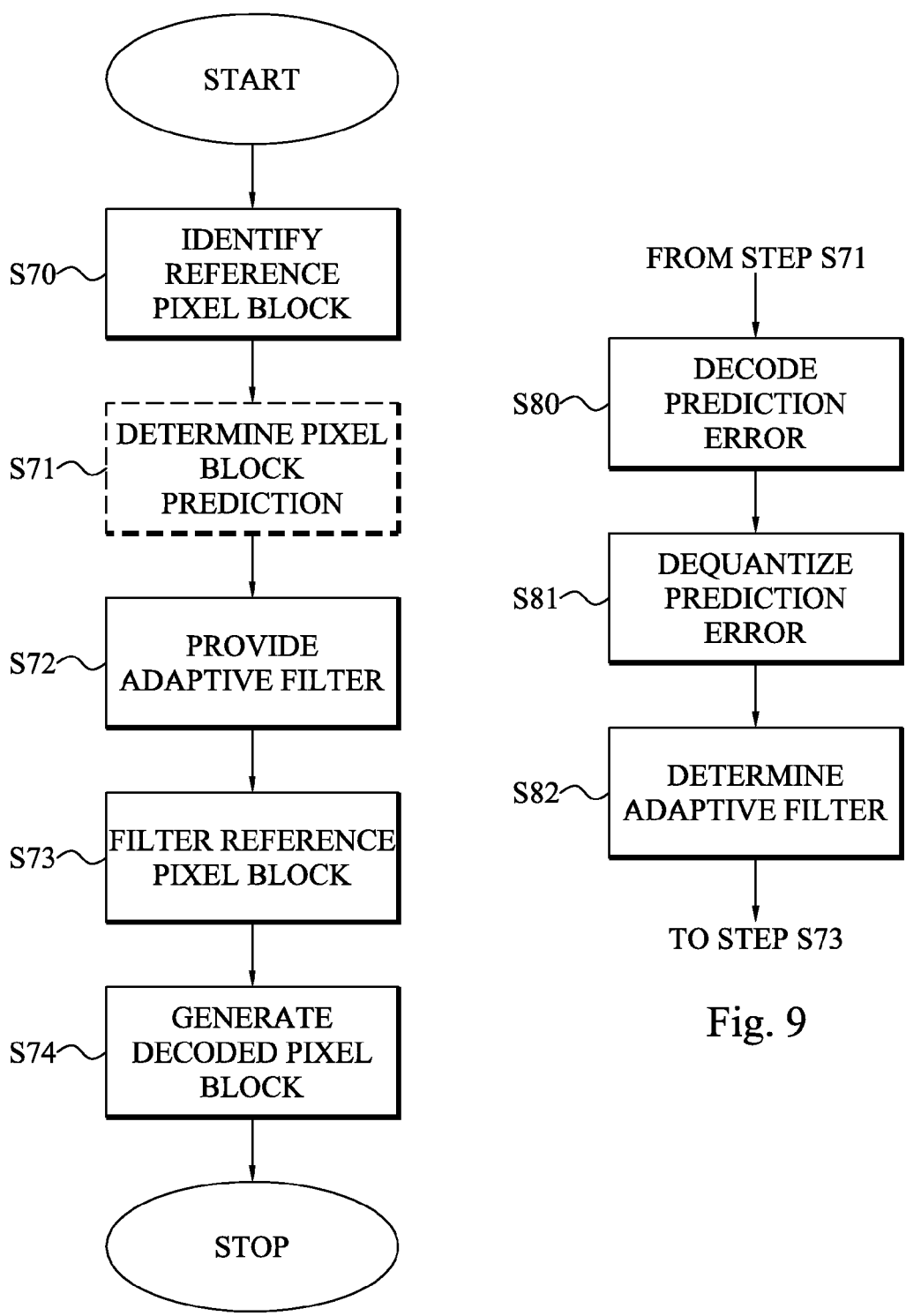
FIG. 8 is a flow diagram illustrating a method of decoding an encoded pixel block using an adaptive filter according to an embodiment.
FIG. 9 is a flow diagram illustrating an embodiment of the filter providing step of the decoding method in FIG. 8.

FIG. 8 is a flow diagram illustrating a corresponding method of decoding an encoded pixel block in a frame of an encoded image or video sequence. The method starts in step S70 where a reference pixel block is identified. This step S70 may optionally involve identifying a reference frame associated with the current pixel block and comprising the reference pixel block. If the pixel block is intra coded, the reference frame is the current frame in the video sequence. However, for inter coded pixel blocks, the frame can, for instance, be a previous frame that is already decoded. In such a case, this reference frame can have a predefined temporal position in the video sequence relative the current frame, such as being the most previous frame. Alternatively, a frame-identifier is associated with the current frame, current slice or even current pixel block for identifying the desired reference frame.

The identified reference pixel block in the reference frame is utilized as a prediction of the current pixel block. This pixel block identification is performed based on a parameter representation associated with the pixel block and present in the coded frame. The representation can be a displacement or motion vector pointing towards the reference pixel block in the reference frame. Alternatively, the parameter representation can specify a particular intra mode that is associated with a particular decoding direction for identifying neighboring pixels in the frame to use as predictions of the current pixel block.

An optional, next step S71 determines a pixel block prediction based on the identified reference block. As was discussed in connection with the block encoding method of FIG. 7, the reference pixel block could be used directly as pixel block prediction. In such a case this step S71 may be omitted. However, in alternative embodiments, the pixel block prediction is obtained by interpolating the reference pixel block with at least one interpolation filter for obtaining sub-pel pixel property values.

The at least one interpolation filter, such as at least one horizontal interpolation filter and at least one vertical interpolation filter, can be predefined, such as utilizing the H.264 interpolation filters. Alternatively, the decoder can be configured for reusing the interpolation filters of the previously decoded pixel block in the frame. This can further be extended by modifying the filter coefficients of the interpolation filter(s) used for the neighboring decoded pixel block based on different criterion, for instance the DC level difference between the two pixel blocks, the difference in residual error of the pixel blocks, etc. It is also possible that the pixel block is associated with a filter modifying representation that is to be applied to the interpolation filter(s) of the neighboring pixel block to obtain the interpolation filter to be used for the current pixel block. This concept can of course be extended even further by actually including representations of the filter coefficients in the at least one interpolation filter.

A next step S72 provides at least one adaptive filter as disclosed herein. The encoded pixel block preferably comprises a representation of the filter coefficients for the at least one adaptive filter. The provision of step S72 then involves generating the at least one adaptive filter based on this representation. For instance, the filter coefficients may be provided in unquantized and uncoded form. Step S72 then involves retrieving them from the encoded data. Alternatively, the representation can include coefficient indices and preferably table indices for the filter taps. In such a case, these indices are used for retrieving a correct filter coefficient for a tap from either a table with coefficients for coarse level of adaptivity or from a table with coefficients with high level of adaptivity.

A further embodiment of step S72 is illustrated in the flow diagram of FIG. 9. The filter provision starts in step S80, where an encoded representation of the adaptive filter, i.e. encoded and quantized prediction errors, is decoded. The decoding of step S80 is basically the inverse of the encoding step S52 of FIG. 6. Thus the decoding is preferably conducted according to an entropy decoding algorithms, such as CABAC, CAVLC, Golomb-Rice, Huffman or Tunnstall. The result of the decoding is a respective quantized prediction error for each filter coefficient of the adaptive filter. These quantized prediction errors are dequantized in step S81. The particular dequantization operation is dictated by the quantization procedure performed by the encoder. For instance, the dequantization can involve shifting the quantized prediction error bitwise L steps to the left: pe=$pe_q$<<L. Alternatively, the quantized prediction error is multiplied by a quantization factor, such as a factor that is a power of two, $2^L$, to get the dequantized prediction error. The quantization parameter L, $2^L$ can be fixed or be present in the encoded pixel block. Yet another approach is to reconstruct the prediction error by sign×index×step, in the case indices are calculated from the prediction errors. When this reconstructed prediction error is added to the reference filter coefficient the filter coefficient is achieved.

The filter coefficients of the adaptive filter are then determined in step S82 based on the dequantized prediction errors and a reference filter, such as a predefined Wiener filter. An alternative reference filter to use for the current pixel block is the adaptive filter provided for the previous pixel block, previous slice or previous frame that has already been decoded in the current frame or video sequence. The filter coefficients are typically determined by adding the respective prediction errors to the respective filter coefficients of the reference filter.

Once the at least one adaptive filter has been provided, such as according to the embodiment of FIG. 9, the pixel property values of the reference pixel block are filtered using the at least one adaptive filter in step S73. The reference pixel property values of the reference pixel block identified in step S70 can be filtered in step S73 in a one-step or a two-step filter process to obtain filter property values. A one-step filter process filters reference pixel in both the horizontal and the vertical direction. In a two-step process, horizontal and vertical filtering is performed in different steps, possibly using different adaptive filters.

The pixel block used as reference block can differ from different pixels of a pixel block to be decoded, in particular for intra decoding. Thus, a first group of neighboring pixels is utilized as reference pixel block in the two-step filtering process for some of the pixels, while other pixel property values are obtained in a separate two-step process involving one or more reference neighboring pixel blocks.

It is anticipated that the filtering conducted in step S73 does not necessarily only involve the pixels of the reference pixel block but could actually also encompass some of the neighboring pixels in the partly decoded frame. Thus, a co-filtering over block boundaries is then achieved.

Finally, step S74 generates a decoded representation of the encoded pixel block based on the filtered pixel property values from step S73 and a representation of residual errors associated with the encoded pixel block. Basically, the filtered reference pixel property values are added pixelwise to the residual errors to get the final representation of the decoded pixel block. Alternatively, the property values of the pixel block prediction are also used in the generation of the decoded representation and are therefore added pixelwise to the sum of the filtered reference pixel property values and the residual errors. The method then ends.

In the foregoing the adaptive filter of the present embodiments have mainly be described in connection with modifying inter or intra predictions, such as to be used to finely adjust the inter/intra interpolation. The adaptive filters can though be used for other applications such as, for instance, pre-filtering, post-filtering and/or loop filtering.

Figure 14:
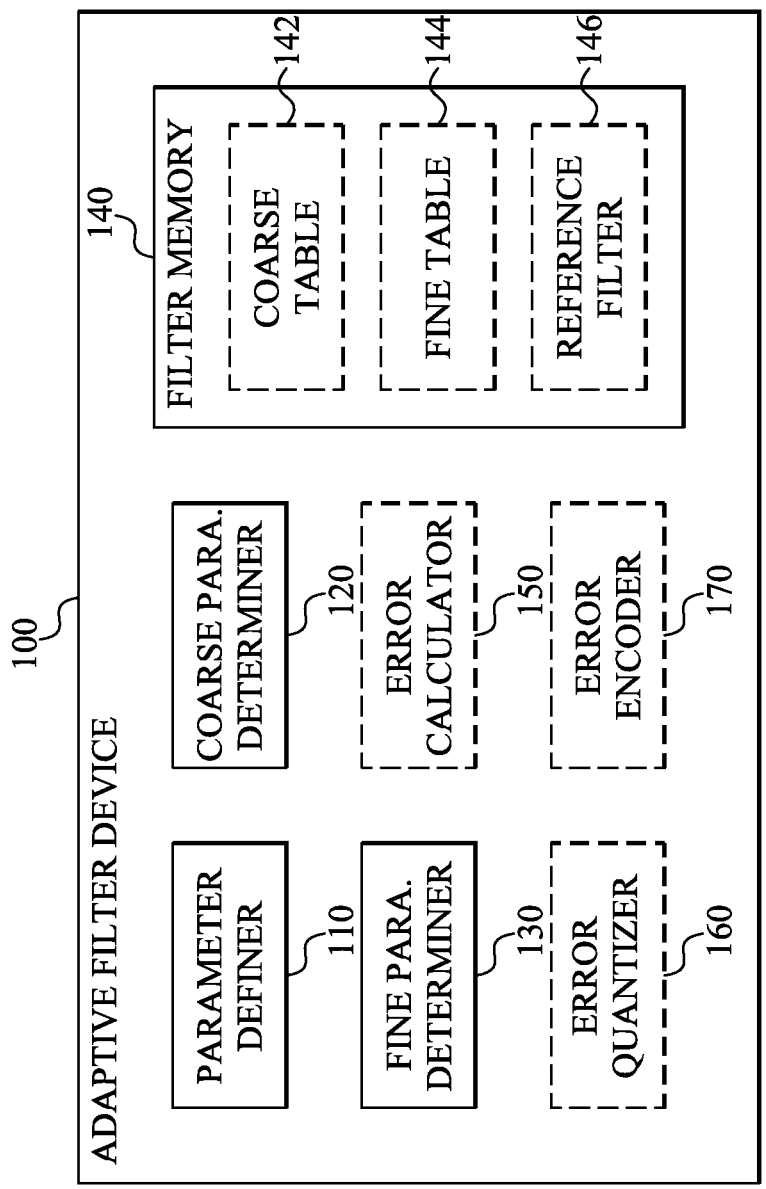
FIG. 14 is a schematic block diagram of a device for determining an adaptive filter according to an embodiment.

FIG. 14 is a schematic block diagram of an adaptive filter device 100 according to an embodiment. The adaptive filter device 100 comprises a filter parameter definer 110 arranged for defining at least one filter parameter of a multi-tap adaptive parameters as having a first, coarse, level of adaptivity. The parameter definer 110 also defines at least one filter parameter of the adaptive filter as having a second, fine, level of adaptivity. This can be extended further, as previously, described to have more than two different levels of adaptivity, and/or also define at least one filter parameter as having zero level of adaptivity, i.e. having fixed filter parameter value. The parameter definer 110 may define filter taps and optionally scaling factor as preferred types of filter parameters having different levels of adaptivity.

A first, coarse, parameter determiner 120 is implemented in the adaptive filter device 100 for determining a respective filter parameter value for the at least one filter parameter having the coarse level of adaptivity as determined by the parameter definer 110. The coarse parameter determiner 120 preferably determines the respective filter parameter value or values among a first, coarse, set of allowable filter parameter values. In such a case, the adaptive filter device 100 preferably comprises a filter memory 140 comprising a first, coarse, table 142 comprising the set of M allowable filter parameter values of the coarse level of adaptivity.

The coarse parameter determiner 120 preferably determines the filter parameter values for the at least one filter parameter with coarse level of adaptivity based on the optimization of an optimization criterion. Any of the previously discussed optimization criteria can be used, including minimizing complexity of a filter operation when filtering input data with the adaptive reference filter, optimizing a frequency shape of the adaptive filter and/or optimizing a scaling or offset of pixel property values of a set of reference pixels filtered by the adaptive filter.

The adaptive filter device 100 also comprises a second, fine, filter parameter determiner 130. In correspondence to the coarse parameter determiner 120, this fine filter coefficient parameter 130 is arranged for determining respective filter parameter value for the at least one filter parameter having the fine level of adaptivity as defined by the parameter definer 110. The fine parameter determiner 130 preferably selects the particular filter parameter value for this/these fine adaptive filter parameter/parameters from a set comprising multiple available parameter values for this level of adaptivity. This second, fine, set also comprises more different parameter values than the first, coarse, set available to the coarse parameter determiner 120.

In a typical embodiment, the filter memory 140 comprises a second, coarse table 144 comprising the available N coefficient values for the fine adaptivity level, where M<N.

The fine parameter determiner 130 is preferably implemented for determining the fine level filter parameter value after the coarse parameter determiner 120 has determined the coarse level filter parameter values. In such a case, the filter parameters with high accuracy, i.e. the fine level coefficients, are determined based on the constraint of the filter parameters with low accuracy, i.e. the coarse level coefficients.

The fine parameter determiner 130 preferably selects or determines the filter parameter values for the filter parameters with fine level of adaptivity based on optimization of a second optimization criterion, which is typically different from the optimization criterion of the coarse parameter determiner 120. For example, the fine parameter determiner 130 preferably determines the fine adaptive filter parameter values by minimizing an error between at least one original pixel property value and at least one predicted pixel property value, where this latter is obtained by filtering a set of multiple reference pixels with the adaptive filter.

The adaptive filter device 100 may also determine a representation of the determined adaptive filter device 100. This representation can then be transmitted from an encoder to a decoder. The representation of the adaptive filter is preferably smaller in terms of the number of bits as compared to the bit sequence corresponding to all the individual filter parameters of the adaptive filter. An example of such a representation is, for each filter tap of the adaptive filter, to include a table index identifying a table of the coarse table 142 and the fine table 144. This table index may be omitted if the adaptive filter has predefined positions of its coarse and fine level filter taps, respectively. In addition, the representation comprises, for each filter tap, a coefficient index identifying one of the coefficient values in the table 142, 144 identified by the table index or through the predefined adaptivity level of the particular tap position in the adaptive filter.

In an alternative embodiment, the filter device 100 comprises an error calculator 150 for calculating, for each filter coefficient of the adaptive filter, a prediction error based on the filter coefficient and a coefficient prediction of a reference filter. This reference filter can be a fixed filter included in a memory location 146 of the adaptive filter device 100. Alternatively, the reference filter is equal to the adaptive filter determined for a previous pixel block if the adaptive filter device 100 is operated to determine at least one adaptive filter for a sequence of pixel blocks in a frame of an image or video sequence.

An error quantizer 160 is implemented for quantizing the prediction errors calculated by the error calculator 150 according to any of the previously disclosed quantization algorithms.

The adaptive filter device 100 preferably also comprises an error encoder 170, such as in the form of an entropy encoder for generating a coded representation of the adaptive filter by, preferably entropy, encoding the quantized prediction errors.

The coded representation then comprises these encoded and quantized prediction errors, optionally the quantization parameter used and optionally an identifier of the reference filter.

The units 110-130, 150-170 of the adaptive filter device 100 may be provided as hardware, software or a combination of hardware and software.

Figure 15:
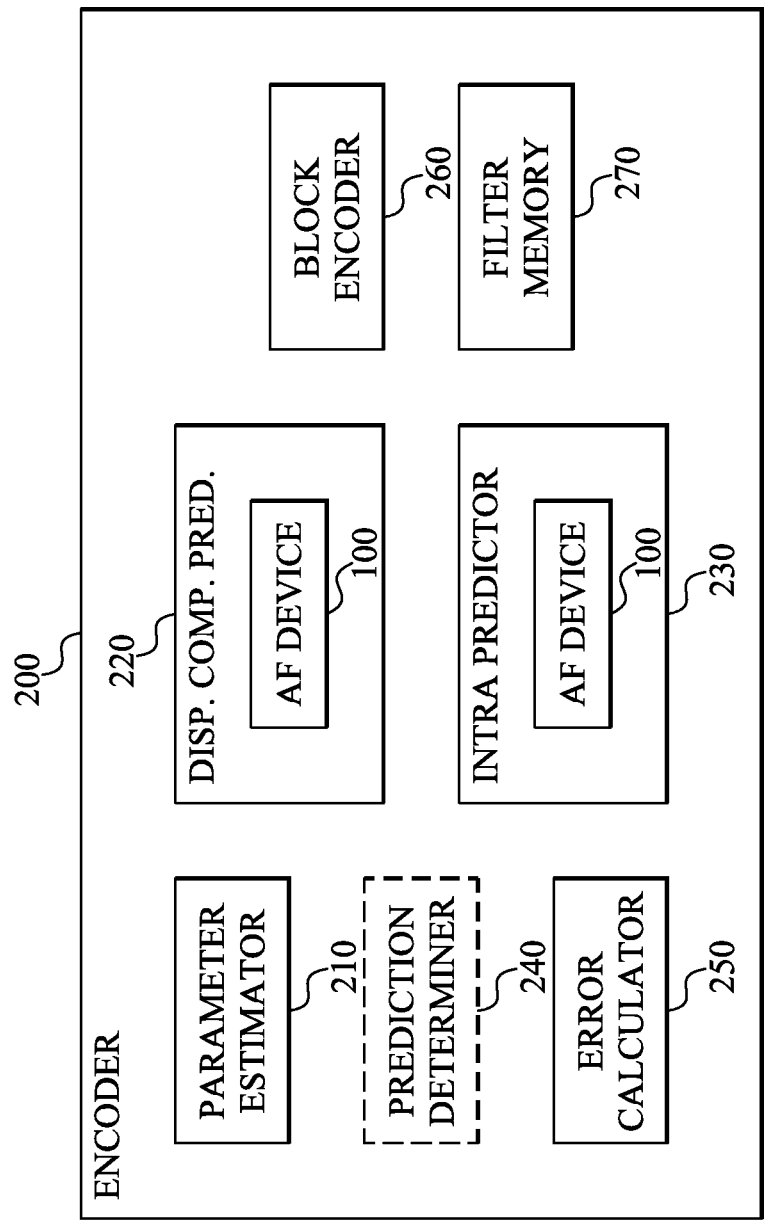
FIG. 15 is a schematic block diagram of an encoder for encoding a pixel block according to an embodiment.

FIG. 15 is a schematic block diagram of an encoder 200 for encoding a pixel block in a frame of a video sequence. A current pixel block is predicted by performing a displacement representation estimation by a parameter estimator 210 from an already provided pixel block in the same frame or in a previous frame. The result of the estimation is a displacement vector associated with the reference pixel block, in the case of inter prediction. The displacement vector is utilized by a displacement compensation predictor 220 for outputting an inter prediction of the pixel block using an optional prediction determiner 240. The prediction determiner 240 may be a separate functionality of the encoder 200 or constitute a part of the displacement compensation predictor 220 and/or the intra predictor 230. The prediction determiner 240 preferably determines the pixel block prediction by filtering the pixel property values of the reference pixel block with at least one interpolation filter fetched from a filter memory 270 or determined by a device 100 as illustrated in FIG. 14.

Alternatively, an intra predictor 230 selects an intra prediction direction as direction representation. The intra predictor 230 also computes an intra prediction of the pixel block, preferably by using at least one interpolation filter and use the operation of the parameter estimator 210 or the device 100 as illustrated in FIG. 14.

A device 100 for determining at least one adaptive filter as previously described is implemented in the encoder 200. This device 100 may constitute a part of the displacement compensation predictor 220 and/or the intra predictor 230 as is illustrated in the figure. Alternatively, the device 100 can be implemented elsewhere in the encoder 200. In either case, the device 100 determines at least one adaptive filter that is applicable to the pixel property values of the reference pixel block.

The inter or intra prediction is forwarded to an error calculator 250 that calculates a residual error based on the pixel property values of the original pixel block, the pixel property values of the reference pixel block filtered by the at least one adaptive filter from the device 100 and optionally the pixel property values of the pixel block prediction.

The residual error is transformed, such as by a discrete cosine transform, and quantized followed by coding with a block encoder 360, such as by an entropy coder. In inter coding, also the estimated displacement vector is brought to the encoder 260 for generating the coded representation of the current pixel block. The coded representation preferably also comprises a representation of the at least one adaptive filter determined by the device 100 and used for filtering the reference pixel block.

The units 100, 210-260 of the encoder 200 may be provided as hardware, software or a combination of hardware and software.

Figure 16:
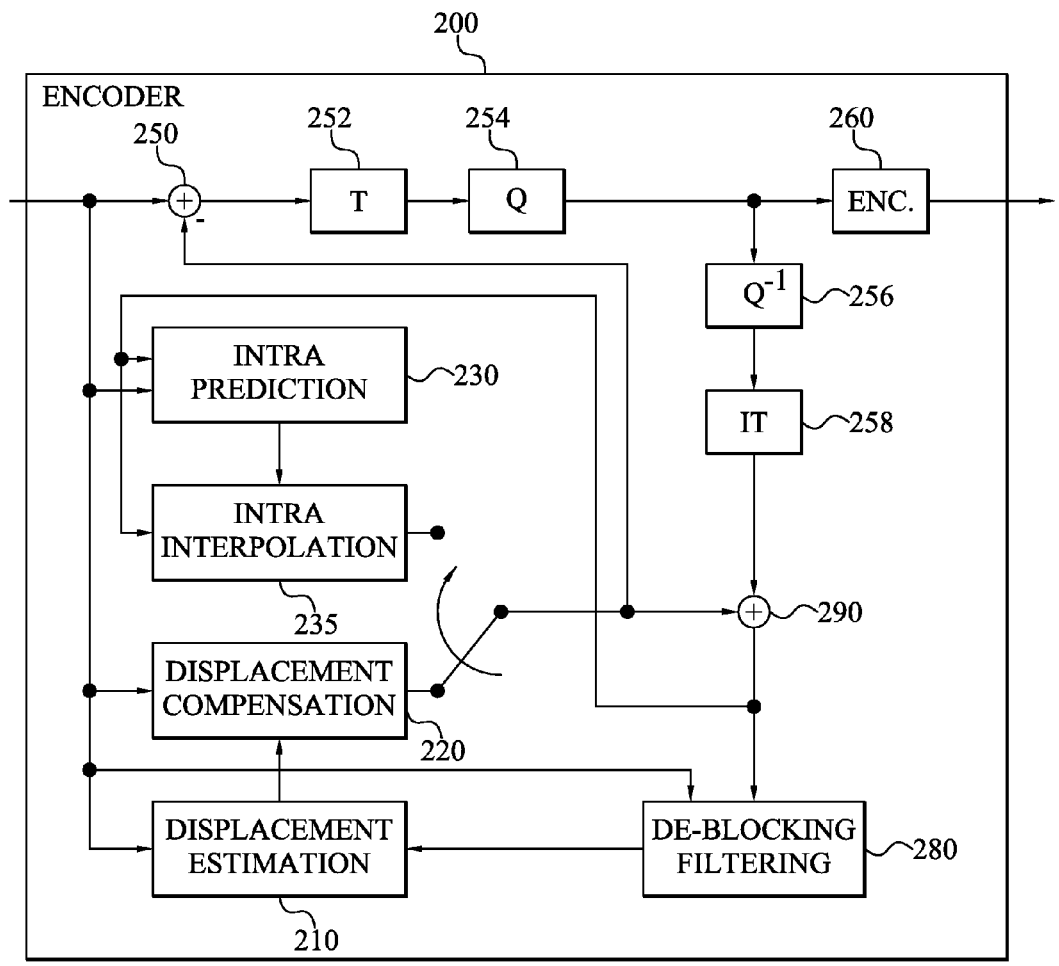
FIG. 16 is a schematic block diagram of an encoder for encoding a pixel block according to another embodiment.

FIG. 16 is a schematic block diagram of the encoder 200 according to another embodiment. The encoder 200 comprises the parameter estimator 210, the displacement compensation predictor 220 and the intra predictor 230 as previously described in connection with FIG. 15. An optional intra interpolator 235 is implemented for determining the pixel block prediction when operating in the intra mode. The intra interpolator 235 then uses at least one interpolation filter or at least one adaptive interpolation filter and applies it to the reference pixel block from the intra predictor 230 to generate the pixel block prediction.

The pixel block prediction and the reference pixel block are forwarded to the error calculator 250 that calculates the residual error as the difference in property values between the original pixel block and the reference and prediction pixel blocks. The residual error is transformed, such as by a discrete cosine transform 252, and quantized 254 followed by encoding 260.

The transformed and quantized residual error for the current pixel block is also provided to a dequantizer 256 and inverse transformer 258 to retrieve the original residual error. This original residual error error is added to the reference pixel block and the pixel block prediction output from the displacement compensation predictor 220 or the intra interpolator 235 to create a reference pixel block that can be used in the prediction and coding of a next pixel block of the frame. This new reference pixel block can optionally first be processed by a deblocking filter 280 before being available to the intra predictor 230, the parameter estimator 210 and the displacement compensation predictor 220.

Figure 17:
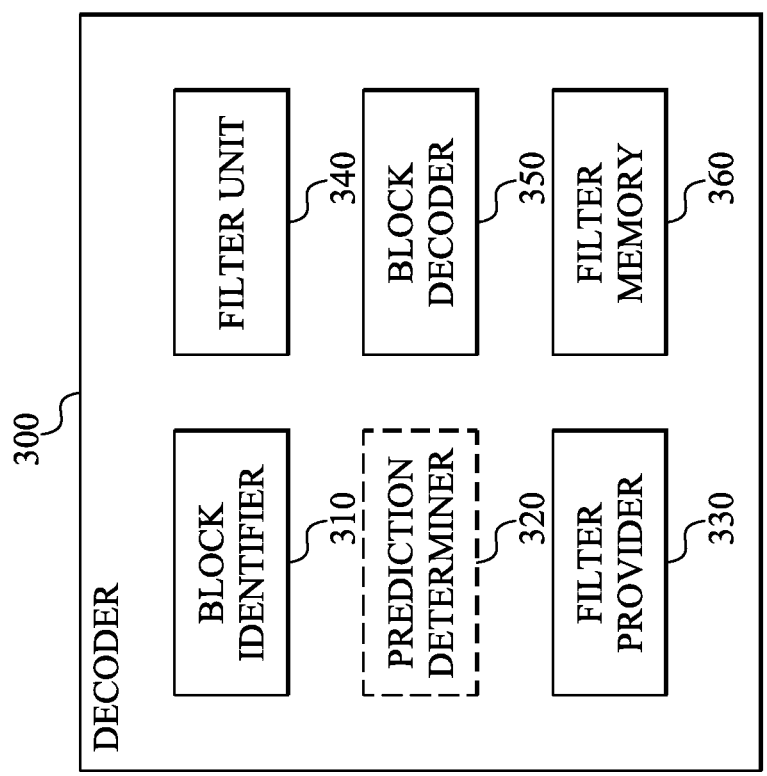
FIG. 17 is a schematic block diagram of a decoder for decoding an encoded pixel block according to an embodiment.

FIG. 17 is a schematic block diagram of a decoder 300 for decoding an encoded pixel block in a frame of an encoded image or video sequence. In this embodiment, the decoder 300 comprises a block identifier 310 for identifying a reference pixel block in the same frame or another frame of the video sequence. The block identifier 310 uses a parameter representation associated with the encoded pixel block, which parameter representation could be a displacement vector in the case of inter prediction and or a mode identifier in the case of intra prediction.

An optional prediction determiner 320 is implemented in the decoder 300 for determining a pixel block prediction based on the reference block identified by the block identifier 310 and preferably at least one interpolation filter provided from a filter memory 360 or at least one adaptive interpolation filter from a filter provider 330.

A filter provider 330 is implemented in the decoder 300 for providing at least one adaptive filter associated with the encoded pixel block and preferably included in the bit stream of the encoded pixel block. Alternatively, the representation of the at least one adaptive filter may have previously been received by the decoder 300 and is therefore present in the filter memory 360.

The decoder 300 comprises a filter unit 340 that uses the at least one adaptive filter from the filter provider 330 to filter the pixel property values of the reference pixel block from the block identifier 310.

A block decoder 350 then uses the filtered reference pixel block from the filter unit 340, optionally the pixel block prediction from the prediction determiner 320 and a representation of a residual error included in the encoded pixel block for generating a decoded representation of the encoded pixel block.

The units 310 to 360 of the decoder 300 may be provided as hardware, software or a combination of hardware and software.

Figure 18:
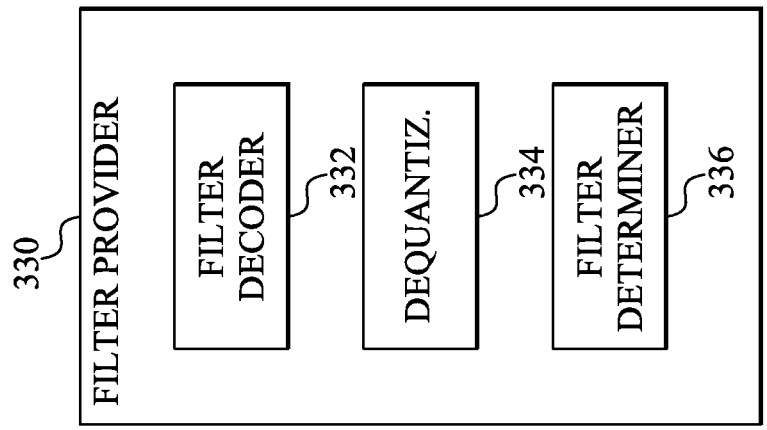
FIG. 18 is a schematic block diagram of an embodiment of the filter provider of the decoder in FIG. 17.

FIG. 18 is a schematic block diagram of an embodiment of the filter provider 330 in the decoder 300 of FIG. 17. The filter provider 330 comprises a filter decoder 332 for decoding an encoded representation of the at least one adaptive filter to get a set of quantized prediction errors, preferably one such prediction error per filter tap in the adaptive filter. The filter decoder 332 is preferably an entropy decoder. The quantized prediction errors are input to a dequantizer 334 that is implemented for dequantizing the prediction errors to get a set of prediction errors. These prediction errors are then used by a filter determiner 336 together with a reference filter, such as a fixed, possibly Wiener filter or a previously decoded adaptive filter, for determining the filter coefficients of the at least one adaptive filter.

The units 332 to 336 of the filter provider 330 may be provided as hardware, software or a combination of hardware and software. The units 332 to 336 may all be implemented in the filter provider 330. Alternatively, a distributed implementation with at least one of the units 332 to 336 provided elsewhere in the decoder is possible.

Figure 19:
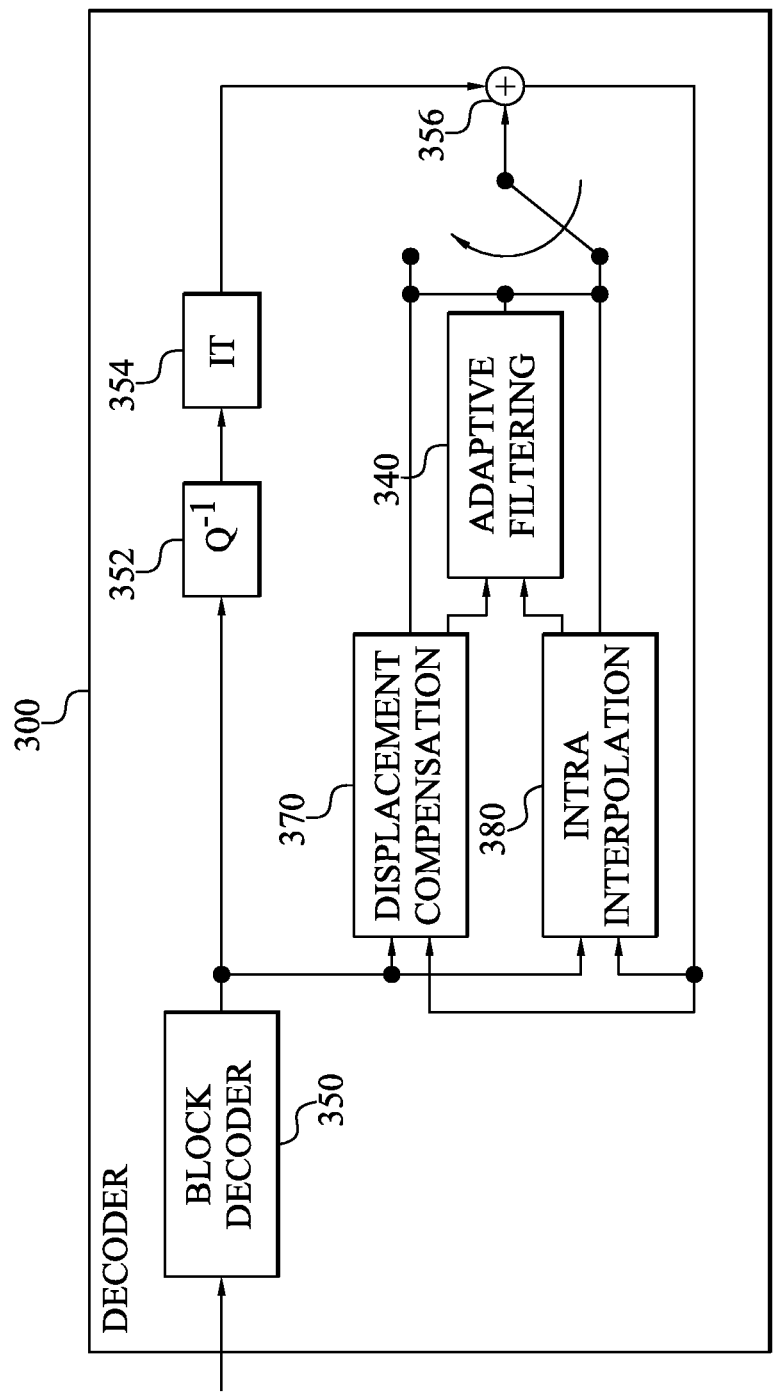
FIG. 19 is a schematic block diagram of a decoder for decoding an encoded pixel block according to another embodiment.

FIG. 19 is a schematic block diagram of another embodiment of the decoder 300. The decoder 300 comprises a block decoder 350 for decoding the encoded representation of the encoded pixel block to get a set of quantized and transformed residual errors. These residual errors are dequantized 352 and inverse transformed 354 to get a set of residual errors.

These residual errors are added to the property values of a reference pixel block and a pixel block prediction. The former being determined through displacement compensation 370 or intra interpolation 380, depending on whether inter or intra prediction is performed. Furthermore, latter is obtained by adaptive filtering of the reference pixel from the displacement compensation 370 or the intra interpolation 380 using the at least one adaptive filter.

EXAMPLE

This example addresses complexity reduction of directional adaptive interpolation filtering (DAIF) in Key Technical Area (KTA). The example illustrates that the filtering complexity of DAIF can be reduced by 21% on average for fixed point arithmetic and by 31% for floating point arithmetic. The computation of the adaptive filter coefficients can be reduced by about 12%. For the Video Coding Experts Group (VCEG) common coding test conditions, the filtering complexity reduction is 6% at an average bit rate increase of 0.8% compared to DAIF. For floating point arithmetic, the complexity reduction is 9% compared to DAIF.

Approach

Previously parameterization of the different sub-pel positions a to o, see FIG. 11, according to shift and frequency shape properties has been performed for separable interpolation filtering [9]. In this case the parameterization is for DAIF [4] in the KTA Model 1.6 [10] and is here denoted DAIFM. Similarly as in [9], the H.264 fixed interpolation filters are used to obtain macroblock partitions and motion vectors. Then also a least squares minimization of the prediction error to obtain filter parameters is similarly done. As in previous work, the frame is then coded with the optimal filters and if the rate distortion cost is lower than for a frame encoded by H.264 filters, the frame is selected to be coded with adaptive filters.

In this work, one of two filter models is selected to represent each of the five filter sets. The filter model parameters for each filter set are determined from a least squares minimization of the prediction error as:

$$E^2 = \sum_n \left( S_n - \sum_i P_{n-i} IF_i + \sum_j P_{n-j} PF_j \right)^2$$

where S is the original frame, P is the reference frame, IF is a reference interpolation filter, PF is an adaptive filter, i is an index to the selected reference interpolation filter coefficients and j is an index to the model parameters. After taking the derivative of $E^2$ with respect to the filter parameters and set the result to 0 give $Ax_m = b$. A is the autocorrelation matrix of size 2×2 and b is the cross correlation vector of size 2×1 for a specific sub-pel position and $x_m$ are the filter parameters for filter model m.

In this example, the adaptive filter can be regarded as composed of an adaptive filter having a coarse level of adaptivity of its filter taps and at least one adaptive filter having a fine level of adaptivity of its/their filter taps. In addition, for each sub-pel position the coarse level adaptive filter can be selected from one of two pre-defined filters thereby achieving a two-level adaptivity for the coarse filter parameters.

The sub-pel positions b and h in FIG. 11 can use the following adaptive filters according to model 1 and model 2:

Model 1: $[1\ -5\ 20\ 20\ -5\ 1]/32 - [a_{12}\ a_{11}\ a_{11}\ a_{12}]$

Model 2: $[-1\ 3\ 14\ 14\ 3\ -1]/32 - [a_{12}\ a_{11}\ a_{11}\ a_{12}]$

The sub-pel positions a and d in FIG. 11 can use the following adaptive filters according to model 1 and model 2:

Model 1: $[1\ -5\ 52\ 20\ -5\ 1]/64 - [a_{21}\ a_{22}]$

Model 2: $[-1\ 0\ 25\ 9\ 0\ -1]/32 - [a_{21}\ a_{22}]$

The sub-pel positions c and l in FIG. 11 can use the following adaptive filters according to model 1 and model 2:

Model 1: $[1\ -5\ 20\ 52\ -5\ 1]/64 - [a_{22}\ a_{21}]$

Model 2: $[-1\ 0\ 9\ 25\ 0\ -1]/32 - [a_{22}\ a_{21}]$

The sub-pel position j in FIG. 11 can use the following adaptive filters according to model 1 and model 2:

$$\text{Model 1: } \begin{bmatrix} 1 & 0 & 0 & 0 & 0 & 1 \\ 0 & -5 & 0 & 0 & -5 & 0 \\ 0 & 0 & 20 & 20 & 0 & 0 \\ 0 & 0 & 20 & 20 & 0 & 0 \\ 0 & -5 & 0 & 0 & -5 & 0 \\ 1 & 0 & 0 & 0 & 0 & 1 \end{bmatrix} \times \frac{1}{64} - \begin{bmatrix} 0 & 0 & 0 & 0 & 0 & 0 \\ 0 & a_{31} & 0 & 0 & a_{31} & 0 \\ 0 & 0 & a_{32} & a_{32} & 0 & 0 \\ 0 & 0 & a_{32} & a_{32} & 0 & 0 \\ 0 & a_{31} & 0 & 0 & a_{31} & 0 \\ 0 & 0 & 0 & 0 & 0 & 0 \end{bmatrix}$$

$$\text{Model 2: } \begin{bmatrix} -1 & 0 & 0 & 0 & 0 & -1 \\ 0 & 2 & 0 & 0 & 2 & 0 \\ 0 & 0 & 7 & 7 & 0 & 0 \\ 0 & 0 & 7 & 7 & 0 & 0 \\ 0 & 2 & 0 & 0 & 2 & 0 \\ -1 & 0 & 0 & 0 & 0 & -1 \end{bmatrix} \times \frac{1}{32} - \begin{bmatrix} 0 & 0 & 0 & 0 & 0 & 0 \\ 0 & a_{31} & 0 & 0 & a_{31} & 0 \\ 0 & 0 & a_{32} & a_{32} & 0 & 0 \\ 0 & 0 & a_{32} & a_{32} & 0 & 0 \\ 0 & a_{31} & 0 & 0 & a_{31} & 0 \\ 0 & 0 & 0 & 0 & 0 & 0 \end{bmatrix}$$

The sub-pel position e in FIG. 11 can use the following adaptive filters according to model 1 and model 2:

$$\text{Model 1:} \begin{bmatrix} 1 & 0 & 0 & 0 & 0 & 0 \\ 0 & -5 & 0 & 0 & 0 & 0 \\ 0 & 0 & 52 & 0 & 0 & 0 \\ 0 & 0 & 0 & 20 & 0 & 0 \\ 0 & 0 & 0 & 0 & -5 & 0 \\ 0 & 0 & 0 & 0 & 0 & 1 \end{bmatrix} \times \frac{1}{64} - \begin{bmatrix} 0 & 0 & 0 & 0 & 0 & 0 \\ 0 & 0 & 0 & 0 & 0 & 0 \\ 0 & 0 & 0 & a_{41} & 0 & 0 \\ 0 & 0 & 0 & a_{42} & 0 & 0 \\ 0 & 0 & 0 & 0 & 0 & 0 \\ 0 & 0 & 0 & 0 & 0 & 0 \end{bmatrix}$$

$$\text{Model 2:} \begin{bmatrix} -10 & 0 & 0 & 0 & 0 & 0 \\ 0 & 0 & 0 & 0 & 0 & 0 \\ 0 & 0 & 25 & 0 & 0 & 0 \\ 0 & 0 & 0 & 9 & 0 & 0 \\ 0 & 0 & 0 & 0 & 0 & 0 \\ 0 & 0 & 0 & 0 & 0 & -1 \end{bmatrix} \times \frac{1}{32} - \begin{bmatrix} 0 & 0 & 0 & 0 & 0 & 0 \\ 0 & 0 & 0 & 0 & 0 & 0 \\ 0 & 0 & 0 & a_{41} & 0 & 0 \\ 0 & 0 & 0 & a_{42} & 0 & 0 \\ 0 & 0 & 0 & 0 & 0 & 0 \\ 0 & 0 & 0 & 0 & 0 & 0 \end{bmatrix}$$

The adaptive filters for sub-pel position o are mirrors of the corresponding adaptive filters for e, and m and g are produced similarly but along the other diagonal.

The sub-pel position f in FIG. 11 can use the following adaptive filters according to model 1 and model 2:

$$\text{Model 1:} \begin{bmatrix} 1 & 0 & 0 & 0 & 0 & 1 \\ 0 & -5 & 0 & 0 & -5 & 0 \\ 0 & 0 & 52 & 52 & 0 & 0 \\ 0 & 0 & 20 & 20 & 0 & 0 \\ 0 & -5 & 0 & 0 & -5 & 0 \\ 1 & 0 & 0 & 0 & 0 & 1 \end{bmatrix} \times \frac{1}{128} - \begin{bmatrix} 0 & 0 & 0 & 0 & 0 & 0 \\ 0 & 0 & 0 & 0 & 0 & 0 \\ 0 & 0 & a_{51} & a_{51} & 0 & 0 \\ 0 & 0 & a_{52} & a_{52} & 0 & 0 \\ 0 & 0 & 0 & 0 & 0 & 0 \\ 0 & 0 & 0 & 0 & 0 & 0 \end{bmatrix}$$

$$\text{Model 2:} \begin{bmatrix} -1 & 0 & 0 & 0 & 0 & -1 \\ 0 & 0 & 0 & 0 & 0 & 0 \\ 0 & 0 & 13 & 13 & 0 & 0 \\ 0 & 0 & 5 & 5 & 0 & 0 \\ 0 & 0 & 0 & 0 & 0 & 0 \\ -1 & 0 & 0 & 0 & 0 & -1 \end{bmatrix} \times \frac{1}{32} - \begin{bmatrix} 0 & 0 & 0 & 0 & 0 & 0 \\ 0 & 0 & 0 & 0 & 0 & 0 \\ 0 & 0 & a_{51} & a_{51} & 0 & 0 \\ 0 & 0 & a_{52} & a_{52} & 0 & 0 \\ 0 & 0 & 0 & 0 & 0 & 0 \\ 0 & 0 & 0 & 0 & 0 & 0 \end{bmatrix}$$

The adaptive filters for sub-pel position n are mirrors of the corresponding filters for f, and l and k are produced similarly but with the adaptive filters rotated 90° counter clockwise.

After optimization of the filter sets for respective filter model, the filter parameters are quantized with 9 bits, one sign bit and 8 bits for magnitude. Then the model with least squared error is selected to represent respective filter set. The coding for each filter set is then performed on the sum of the selected filter parameters and one of the filter parameters.

Filtering Complexity

Here follows a comparison of the average number of operations for fixed point arithmetic sub-pel interpolation and number of operations for the worst case for 8×8 pixel block interpolation for H.264, DAIF and DAIFM respectively. Numbers for DAIF are taken from [4]. Costs for multiplications, additions and shifts are assumed to be equal. The average cost to determine sub-pel positions are calculated similarly as in [11].

H.264

Here follows calculations of the number of operations for different sub-pel positions:

$a_{op}$, $c_{op}$, $d_{op}$, $l_{op}$: $C3+b+1>>1 \rightarrow 12$ operations $b_{op}$, $h_{op}$: $C1+C6+(C2+C5)\times(-5)+(C3+C4)\times 20+16>>5 \rightarrow 9$ operations $e_{op}$, $g_{op}$, $m_{op}$, $o_{op}$: $b+h+1>>1 \rightarrow 21$ operations $f_{op}$, $n_{op}$, $i_{op}$, $k_{op}$: $b+j+1>>1 \rightarrow 66$ operations $j_{op}$: $b1+b6+(b2+b5)\times(-5)+(b3+b4)\times 20+32>>5 \rightarrow 63$ operations $f_{average}$: $(8\times f_{op}+56\times(2\times b_{op}+3)9/64=26.6$ operations $j_{average}$: $(8\times j_{op}+56\times(2\times b_{op}))/64=23.6$ operations Average: $(4\times a_{op}+2\times b_{op}+4\times e_{op}+4\times f_{average}+j_{average})/15=18.7$ operations Worst case: 26.6 operations

DAIFM

Here follows calculations of the number of operations for fixed point arithmetic for the different sub-pel positions for model 1, where $h_{1,2}$ are optimized filter coefficients and $g_{1,2}$ are fixed filter coefficients.

$a_{op}$, $c_{op}$, $d_{op}$, $l_{op}$: $((C1+C6)<<g_1)+(C2+C5)\times g_2+C3\times h_1+C4\times h_2+128>>8 \rightarrow 11$ operations $b_{op}$, $h_{op}$: $((C1+C6)<<g_1+(C2+C5)\times g_2+(C3+C4)\times h_2+128>>8 \rightarrow 10$ operations $e_{op}$, $g_{op}$, $m_{op}$, $o_{op}$: same as $a_{op}$, $c_{op}$, $d_{op}$, $l_{op} \rightarrow 11$ operations $f_{op}$, $n_{op}$, $i_{op}$, $k_{op}$: $((A1+A6+F1+F6)<<g_1)+(B2+B5+E2+E5)\times g_2+(C3+C4)\times h_1+(D3+D4)\times h_2+128>>8 \rightarrow 17$ operations $j_{op}$: $((A1+A6+F1+F6)<<g_1+(B2+B5+E2+E5)\times h_1+(C3+C4+D3+D4)\times h_2+128>>8 \rightarrow 16$ operations The average cost per pixel for model 1 is thus:

$(8\times a_{op}+2\times b_{op}+j_{op}+4\times f_{op})/15=12.8$ operations

Model 2 has the following number of operations for respective sub-pel position:

$a_{op}$, $c_{op}$, $d_{op}$, $l_{op}$: $((C1+C6)<<g_1)+C3\times h_1+C4\times h_2+128>>8 \rightarrow 8$ operations $b_{op}$, $h_{op}$: $((C1+C6)<<g_1+(C2+C5)\times h_1+(C3+C4)\times h_2+128>>8 \rightarrow 10$ operations $e_{op}$, $g_{op}$, $m_{op}$, $o_{op}$: same as $a_{op}$, $c_{op}$, $d_{op}$, $l_{op} \rightarrow 8$ operations $f_{op}$, $n_{op}$, $i_{op}$, $k_{op}$: $((A1+A6+F1+F6)<<g_1)+(C3+C4)\times h_1+(D3+D4)\times h_2+128>>8 \rightarrow 12$ operations $j_{op}$: $((A1+A6+F1+F6)<<g_1+(B2+B5+E2+E5)\times h_1+(C3+C4+D3+D4)\times h_2+128>>8 \rightarrow 16$ operations The average cost per pixel for model 2 is thus:

$(8\times a_{op}+2\times b_{op}+j_{op}+4\times f_{op})/15=9.87$ operations

Assuming equal probability for both models and all sub-pel positions DAIFM has an average cost of 11.33 operations. DAIF has an average cost of 14.4 operations per pixel. This means that DAIFM can reduce DAIF filtering cost by 21% on average. On worst case DAIF has 19 operations per pixel and DAIFM has 17 operations per pixel. H.264 has an average filter cost of 18.7 operations for 8×8 pixel blocks. This means that DAIFM can reduce the average filtering cost of H.264 by 39%.

It is noted that the filtering with the border filter taps of the adaptive filter of this embodiment can be achieved by shift operation, since it is a multiple of 2, instead of multiplication. The shift value is also fixed for respective sub-pel position.

For a floating point arithmetic the filtering cost is even lower for DAIFM since no multiplication nor shift is needed for the border filter taps of the adaptive filter since they are fixed to 1 respective −1 for the two models. For this case, DAIFM has 10.8 operations for model 1 and 7.9 operations for model 2, giving an average cost of 9.3 operations per pixel. Thus, the filtering complexity can be reduced by 31% on average compared to DAIF and by 48% compared to H.264.

Encoder Complexity

The main encoder complexity for an adaptive interpolation approach is to determine the cross-correlation vector and the autocorrelation matrix. DAIF requires between 18 and 63 operations per pixel, whereas the proposed embodiment DAIFM only needs between 32 and 39 operations per pixel to accumulate the statistics. This means that DAIFM reduces the complexity of accumulating the statistics by about 12%. Solving equations with 3 respective 6 unknown parameters as needed for DAIF is also more complex than solving equations with two unknown parameters as for DAIFM.

Error Robustness

Coding each of the 15 sub-pel positions separately potentially also increases the robustness compared to DAIF which bundles several sub-pels to use the same coding.

Experimental Results

Below is DAIFM compared with DAIF and H.264 (KTA 1.6) with respect to coding efficiency using BD metrics [12] and computational complexity for the VCEG common coding conditions [13]. The total average is 0.8% bit rate increase compared to DAIF. A complexity comparison shows that DAIFM can reduce the filtering cost by 6% compared to dAIF and by 16% compared to H.264 for fixed point arithmetic. For floating point arithmetic DAIFM can reduce the filtering cost by 9% compared to DAIF and 19% compared to H.264.

TABLE 2

Filtering complexity for all frames of the VCEG test conditions

| | Probability Adaptive frames | Probability model 1 | Probability model 2 | OPP* (fixed point arithmetic) | OPP* (floating point arithmetic) |
|---|---|---|---|---|---|
| DAIFM | 0.46 | 0.88 | 0.12 | 15.8 | 14.4 |
| DAIF | 0.43 | — | — | 16.9 | 15.9 |
| H.264 | — | — | — | 18.7 | 17.7 |

*Operations per pixel

The total measured computational time for both encoding and decoding for the HD sequences on the baseline test conditions is 517,671 s for DAIFM, the time for H.264 is 273,095 s and the time for DAIF is 526,929 s.

It will be understood by a person skilled in the art that various modifications and changes may be made to the present invention without departure from the scope thereof, which is defined by the appended claims.

REFERENCES

[1] ITU-T Rec. H.264/ISO/IEC MPEG 14496-10, 2003
[2] Vatis et al., Two-dimensional non-separable adaptive Wiener interpolation filter for H-264/AVC, *ITU—Telecommunications Standardization Sector*, Study Group 16, Question 6, Document VCEG-Z17, April 2005
[3] Wittman and Wedi, Separable adaptive interpolation filter, *ITU—Telecommunications Standardization Sector*, Study Group 16, Question 6, Document C-219, July 2007
[4] Rusanovskyy et al., Adaptive interpolation with directional filters, *ITU—Telecommunications Standardization Sector*, Study Group 16, Question 6, Document VCEG-AG21, October 2007
[5] Ye and Karcwewicz, Enhanced adaptive interpolation filter, *ITU—Telecommunications Standardization Sector*, Study Group 16, Question 6, Document C-464, April 2008
[6] Y. Vatis and J. Osterman, "Locally adaptive non-separable interpolation filter for H.264/AVC", ICIP 2006
[7] T. Wedi, "Adaptive interpolation filter for motion and aliasing compensated filtering", VCIP 2002
[8] ITU-Telecommunications Standardization Sector, VCEG-AG05, "Adaptive Multidirectional intra prediction"
[9] K. Andersson, "Complexity reduced separable adaptive interpolation filter", *ITU—Telecommunications Standardization Sector*, Study Group 16, Question 6, Document VCEG-AH27, January 2008
[10] KTA reference Model 1.6, January 2008, which may be downloaded from the iphome.hhi.de website using extensions /suehring/tml/download/KTA/jm11.0kta1.6.zip
[11] Y. Vatis and J. Ostermann, "Comparison of complexity between two-dimensional non-separable adaptive interpolation filter and standard Wiener filter", *ITU—Telecommunications Standardization Sector*, Study Group 16, Question 6, Document VCEG-AA11, October 2005
[12] G. Bjøntegaard, "Calculation of average PSNR differences between RD-Curves", *ITU—Telecommunications Standardization Sector*, Study Group 16, Question 6, Document VCEG-M33, April 2001
[13] T. K. Tan et al., "Recommended simulation common conditions for coding efficiency experiments revision 2", *ITU—Telecommunications Standardization Sector*, Study Group 16, Question 6, Document VCEG-AH10, January 2008

The invention claimed is:

1. A method of determining an adaptive filter having multiple filter parameters in the form of multiple filter taps and an optional scaling factor, said method comprising the steps of:
   a) defining at least one filter parameter of said multiple filter parameters as having a coarse level of adaptivity, for which a filter parameter value can be selected among a first set of allowable filter parameter values;
   b) defining at least one other filter parameter of said multiple filter parameters as having a fine level of adaptivity, for which a filter parameter value can be selected among a second set of allowable filter parameters, the first set of allowable filter parameter values being smaller than the second set of allowable filter parameter values;
   c) determining a filter parameter value for said at least one filter parameter having the coarse level of adaptivity among the first set of allowable filter parameter values based on optimization of a first optimization criterion selected from the group of:
      i) minimizing complexity of a filtering operation with the adaptive filter by selectin the filter parameter value among the first set of allowable filter parameter values to limit the filtering operation to additions and/or shifts,
      ii) optimizing a frequency shape of the adaptive filter to achieve a desired lowpass filtering characteristic of the adaptive filter by selectin an adaptive scaling factor for the adaptive filter among the first set of allowable filter parameter values, and
      iii) optimizing pixel value scaling by selecting an adaptive scaling factor for the adaptive filter to be equal to a difference in or a quotient between an average value of at least one original pixel block in a current frame of an image or video sequence and an average value of at least one reference pixel block in a reference frame of the image or video sequence;

wherein optimizing the first optimization criterion includes selecting the filter parameter value for the at least one filter parameter from the first set of allowable filter parameter values that optimizes the first optimization criterion; and d) determining a filter parameter value for said at least one filter parameter having the fine level of adaptivity among the second set of allowable filter parameter values, based on optimization of a second, different optimization criterion that minimizes a prediction error between an original pixel block of the current frame and the at least one reference block of the reference frame filtered with the adaptive filter;

wherein optimizing the second optimization criterion involves selecting the filter parameter value for the at least one filter parameter from the second set of allowable filter parameter values that optimizes the second optimization criterion.

2. The method according to claim 1, wherein said determining step d) includes determining said filter parameter value for said at least one filter parameter having the fine level of adaptivity following determining said filter parameter value for said at least one filter parameter having the coarse level of adaptivity in said determining step c).

3. The method according to claim 1, wherein:
said defining step a) includes defining at least one filter tap of said multiple filter taps as having the coarse level of adaptivity;
said defining step b) includes defining at least one filter tap of said multiple filter taps as having the fine level of adaptivity;
said determining step c) includes determining a filter coefficient for said at least one filter tap having the coarse level of adaptivity among a first set of allowable filter coefficients; and
said determining step d) includes determining a filter coefficient for said at east one filter tap having the fine level of adaptivity among a second set of allowable filter coefficients, wherein said first set of allowable filter coefficients is smaller than said second set of allowable filter coefficients.

4. The method according to claim 3, further comprising the steps of:
determining, for each filter coefficient of said adaptive filter, a prediction error of said filter coefficient based on a coefficient prediction from a reference filter;
quantizing said prediction errors; and
generating a coded representation of said adaptive filter by encoding said quantized prediction errors.

5. The method according to claim 1, further comprising inter-encoding a current pixel block comprising pixels having pixel values in a current frame of an image or video sequence, said inter-encoding step comprising:
estimating, based on the pixel values of the current pixel block and in a motion vector estimation procedure, a motion vector associated with a reference pixel block in a reference frame of said image or video sequence;
filtering pixel values of said reference pixel block with the adaptive filter determined in steps a) through d);
calculating a residual error based on said pixel values of the current pixel block and said filtered pixel values of the reference pixel block; and providing a representation of the motion vector and a representation of the residual error as an encoded representation of the current pixel block.

6. The method according to claim 1, further comprising decoding an intra-encoded pixel block in a current frame of an encoded image or video sequence, said decoding step comprising:
identifying a reference pixel block in a reference frame of said encoded image or said video sequence based on a parameter representation defining a prediction mode and being associated with said intra-encoded pixel block;
filtering pixel values of said reference pixel block with the adaptive filter determined in steps a) through d); and
determining a decoded representation of said intra-encoded pixel block based on said filtered pixel values of said reference pixel block and a representation of residual errors associated with said intra-encoded pixel block.

7. The method according to claim 1, further comprising intra-encoding a current pixel block comprising pixels having pixel values in a current frame of an image or video sequence, said inter-encoding step comprising:
estimating, based on the pixel values of the current pixel block and in a rate distortion optimization procedure, a parameter representation defining a prediction mode and being associated with a reference pixel block in the current frame;
filtering pixel values of the reference pixel block with the adaptive filter determined in steps a) through d);
calculating a residual error based on the pixel values of the current pixel block and the filtered pixel values of the reference pixel block; and
providing a representation of the parameter representation and a representation of the residual error as an encoded representation of the current pixel block.

8. The method according to claim 1, further comprising decoding an inter-encoded pixel block in a current frame of an encoded image or video sequence, said decoding step comprising:
identifying a reference pixel block in a reference frame of the encoded image or the video sequence based on a motion vector associated with the inter-encoded pixel block;
filtering pixel values of the reference pixel block with the adaptive filter determined in steps a) through d); and
determining a decoded representation of the inter-encoded pixel block based on the filtered pixel values of the reference pixel block and a representation of residual errors associated with the inter-encoded pixel block.

9. A device for determining an adaptive filter having multiple filter parameters in the form of multiple filter taps and an optional scaling factor, said device comprising:
a filter parameter definer configured to define at least one filter parameter of said multiple filter parameters as having a coarse level of adaptivity, for which a filter parameter value can be selected amen a first set of allowable filter parameter values, and configured to define at least one other filter parameter of said multiple filter parameters as having a fine level of adaptivity, for which a filter parameter value can be selected among a second set of allowable filter parameters, the first set of allowable filter parameter values being smaller than the second set of allowable filter parameter values;
a first parameter determiner configured to determine a filter parameter value for said at least one filter parameter having the coarse level of adaptivity among the first set of allowable filter parameter values based on optimization of a first optimization criterion selected from the group of:
  i) minimizing complexity of a filtering operation with the adaptive filter by selecting the filter parameter value among the first set of allowable filter parameter values to limit the filtering operation to additions and/or shifts,
  ii) optimizing a frequency shape of the adaptive filter to achieve a desired lowpass filtering characteristic of the adaptive filter by selecting an adaptive scaling factor for the adaptive filter among the first set of allowable filter parameter values, and
  iii) optimizing pixel value scaling by selecting an adaptive scaling factor for the adaptive filter to be equal to a difference in or a quotient between an average value of at least one original pixel block in a current frame of an image or video sequence and an average value of at least one reference pixel block in a reference frame of the image or video sequence;
wherein optimizing the first optimization criterion includes selecting the filter parameter value for the at least one filter parameter from the first set of allowable filter parameter values that optimizes the first optimization criterion; and
a second filter parameter determiner for determining configured to determine a filter parameter value for said at least one filter tap having the fine level of adaptivity among the second set of allowable filter parameter values, based on optimization of a second, different optimization criterion that minimizes a prediction error between an original pixel block of the current frame and the at least one reference block of the reference frame filtered with the adaptive filter;
wherein optimizing the second optimization criterion involves selecting the filter parameter value for the at least one filter parameter from the second set of allowable filter parameter values that optimizes the second optimization criterion.

10. The device according to claim 9, wherein said second parameter determiner is configured to determine the filter parameter value for said at least one filter parameter having the fine level of adaptivity after said first parameter determiner has determined said filter parameter value for said at least one filter parameter having the coarse level of adaptivity.

11. The device according to claim 9, wherein:
said filter parameter definer is configured to define at least one filter tap of said multiple filter taps as having the coarse level of adaptivity and to define at least one filter tap of said multiple filter taps as having the fine level of adaptivity;
said first parameter determiner is configured to determine a filter coefficient for said at least one filter tap having the coarse level of adaptivity among a first set of allowable filter coefficients; and
said second filter parameter determiner is configured to determine a filter coefficient for said at least one filter tap having the fine level of adaptivity among a second set of allowable filter coefficients, wherein said first set of allowable filter coefficients is smaller than said second set of allowable filter coefficients.

12. The device according to claim 11, further comprising:
an error calculator for calculating, for each filter coefficient of said adaptive filter, a prediction error of said filter coefficient based on a coefficient prediction from a reference filter;
an error quantizer for quantizing said prediction errors calculated by said error calculator; and
an error encoder for generating a coded representation of said adaptive filter by encoding said quantized prediction errors quantized by said error quantizer.

13. The device according to claim 9, wherein the adaptive filter is implemented in an encoder for intra-encoding a current pixel block in a frame of an image or video sequence, said encoder comprising:
a parameter estimator configured to estimate, based on pixel values of said current pixel block and in a rate distortion optimization procedure, a parameter representation defining a prediction mode and being associated with a reference pixel block in the current frame;
an error calculator configured to calculate a residual error based on said pixel values of said current pixel block, said pixel values of said reference pixel block, and the adaptive filter determined by said device; and
a block encoder configured to provide a representation of said parameter representation and a representation of said residual error as an encoded representation of said current pixel block.

14. The device according to claim 9, wherein the adaptive filter is implemented in a decoder for decoding an intra-encoded pixel block in a current frame of an encoded image or video sequence, said decoder comprising:
a block identifier configured to identify a reference pixel block in the current frame of said encoded image or said video sequence based on a parameter representation defining a prediction mode and being associated with said intra-encoded pixel block;
a filter unit configured to filter pixel values of said reference pixel block identified by said block identifier with the adaptive filter provided by the device; and
a block decoder configured to determine a decoded representation of said intra-encoded pixel block based on said filtered pixel values of said reference pixel block and a representation of residual errors associated with said intra-encoded pixel block.

15. The device according to claim 9, wherein the adaptive filter is implemented in an encoder for inter-encoding a current pixel block in a frame of an image or video sequence, said encoder comprising:
a parameter estimator configured to estimate, based on pixel values of the current pixel block and in a motion vector estimation procedure, a motion vector associated with a reference pixel block in a reference frame of the image or video sequence;
an error calculator configured to calculate a residual error based on the pixel values of the current pixel block, the pixel values of the reference pixel block, and the adaptive filter determined by the device; and
a block encoder configured to provide a representation of the motion vector and a representation of the residual error as an encoded representation of the current pixel block.

16. The device according to claim 9, wherein the adaptive filter is implemented in a decoder for decoding an inter-encoded pixel block in a current frame of an encoded image or video sequence, said decoder comprising:
a block identifier configured to identify a reference pixel block in a reference frame of said encoded image or said video sequence based on a motion vector associated with said inter-encoded pixel block;
a filter unit configured to filter pixel values of the reference pixel block identified by the block identifier with the adaptive filter provided by the device; and a block decoder configured to determine a decoded representation of said inter-encoded pixel block based on the filtered pixel values of the reference pixel block and a representation of residual errors associated with the inter-encoded pixel block.

* * * * *

UNITED STATES PATENT AND TRADEMARK OFFICE
CERTIFICATE OF CORRECTION

PATENT NO.        : 8,576,906 B2
APPLICATION NO.   : 12/811595
DATED             : November 5, 2013
INVENTOR(S)       : Andersson et al.

It is certified that error appears in the above-identified patent and that said Letters Patent is hereby corrected as shown below:

On the Title Page, Item (75), under "Inventors", in Column 1, Line 1, delete "Gavle" and insert -- Gävle --, therefor.

On the Title Page, Item (75), under "Inventors", in Column 1, Line 4, delete "Per Frojdh," and insert -- Per Fröjdh, --, therefor.

On the Title Page, Item (75), under "Inventors", in Column 1, Line 5, delete "Sjoberg," and insert -- Sjöberg, --, therefor.

In the Specification

In Column 10, Line 4, delete "Tunnstall," and insert -- Tunstall, --, therefor.

In Column 16, Line 44, delete "Tunnstall." and insert -- Tunstall. --, therefor.

In Column 20, Line 29, delete "error error" and insert -- error --, therefor.

In Column 25, Line 33, delete "dAIF" and insert -- DAIF --, therefor.

In the Claims

In Column 26, Line 56, in Claim 1, delete "selectin" and insert -- selecting --, therefor.

In Column 26, Line 62, in Claim 1, delete "selectin" and insert -- selecting --, therefor.

In Column 27, Line 42, in Claim 3, delete "east" and insert -- least --, therefor.

In Column 28, Line 57, in Claim 9, delete "amen" and insert -- among --, therefor.

Signed and Sealed this
Eighth Day of July, 2014

Michelle K. Lee
*Deputy Director of the United States Patent and Trademark Office*